(12) United States Patent
Sheehy et al.

(10) Patent No.: US 11,728,651 B1
(45) Date of Patent: Aug. 15, 2023

(54) SYSTEMS AND METHODS FOR OPTIMIZED LOADING OF BATTERY INVERTERS

(71) Applicant: 8ME NOVA, LLC, El Dorado Hills, CA (US)

(72) Inventors: Finbar Sheehy, San Diego, CA (US); Gautham Ramesh, Emeryville, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/131,251

(22) Filed: Apr. 5, 2023

(51) Int. Cl.
*H02J 3/32* (2006.01)
*H02J 7/00* (2006.01)

(52) U.S. Cl.
CPC ............ *H02J 3/32* (2013.01); *H02J 7/0063* (2013.01); *H02J 7/0071* (2020.01); *H02J 7/00712* (2020.01); *H02J 2207/20* (2020.01)

(58) Field of Classification Search
CPC ........ H02J 3/32; H02J 7/00712; H02J 7/0071; H02J 7/0063; H02J 2207/20
See application file for complete search history.

(56) References Cited

U.S. PATENT DOCUMENTS

| 7,248,490 B2 * | 7/2007 | Olsen | H02M 7/493 363/71 |
|---|---|---|---|
| 2017/0149248 A1 * | 5/2017 | Della Sera | H02M 7/537 |
| 2021/0249860 A1 * | 8/2021 | Moore | H02J 3/40 |

* cited by examiner

*Primary Examiner* — Jared Fureman
*Assistant Examiner* — Duc M Pham
(74) *Attorney, Agent, or Firm* — Foley & Lardner LLP

(57) ABSTRACT

The present disclosure provides systems and methods for optimizing loading of battery inverters. A system may include a plurality of inverters configured to output power to a load; a switching system connected to the plurality of inverters; a plurality of energy storage units selectively coupled to the plurality of energy storage units by the switching system; and a controller. The controller can be configured to determine a required power for the load; determine a number of the plurality of inverters to provide the required power; determine a switching position for the switching system based on the determined number of the plurality of inverters, the switching position corresponding to power delivery by a set of the plurality of inverters; and send a control signal to the switching system to connect one or more of the plurality of energy storage units with the set of the plurality of inverters.

20 Claims, 25 Drawing Sheets

512 →

| | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 100% | 0% | 0% | 0% | 0% | 0% | 0% | 0% | 0% | 0% |
| Period 2 | 0% | 100% | 0% | 0% | 0% | 0% | 0% | 0% | 0% | 0% |
| Period 3 | 0% | 0% | 100% | 0% | 0% | 0% | 0% | 0% | 0% | 0% |
| Period 4 | 0% | 0% | 0% | 100% | 0% | 0% | 0% | 0% | 0% | 0% |
| Period 5 | 0% | 0% | 0% | 0% | 100% | 0% | 0% | 0% | 0% | 0% |
| Period 6 | 0% | 0% | 0% | 0% | 0% | 100% | 0% | 0% | 0% | 0% |
| Period 7 | 0% | 0% | 0% | 0% | 0% | 0% | 100% | 0% | 0% | 0% |
| Period 8 | 0% | 0% | 0% | 0% | 0% | 0% | 0% | 100% | 0% | 0% |
| Period 9 | 0% | 0% | 0% | 0% | 0% | 0% | 0% | 0% | 100% | 0% |
| Period 10 | 0% | 0% | 0% | 0% | 0% | 0% | 0% | 0% | 0% | 100% |
| Period 11 | 100% | 0% | 0% | 0% | 0% | 0% | 0% | 0% | 0% | 0% |

FIG. 5B

| | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 100% | 0% | 0% | 0% | 0% | 0% | 0% | 0% | 0% | 0% |
| Period 2 | 0% | 0% | 100% | 100% | 0% | 0% | 0% | 0% | 0% | 0% |
| Period 3 | 0% | 0% | 0% | 0% | 100% | 100% | 0% | 0% | 0% | 0% |
| Period 4 | 0% | 0% | 0% | 0% | 0% | 0% | 100% | 100% | 0% | 0% |
| Period 5 | 0% | 0% | 0% | 0% | 0% | 0% | 0% | 0% | 100% | 100% |
| Period 6 | 100% | 100% | 0% | 0% | 0% | 0% | 0% | 0% | 0% | 0% |

| | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 100% | 0% | 0% | 0% | 0% | 0% | 0% | 0% | 0% | 100% |
| Period 2 | 0% | 100% | 0% | 0% | 0% | 0% | 0% | 0% | 100% | 0% |
| Period 3 | 0% | 0% | 100% | 0% | 0% | 0% | 0% | 100% | 0% | 0% |
| Period 4 | 0% | 0% | 0% | 100% | 0% | 0% | 100% | 0% | 0% | 0% |
| Period 5 | 0% | 0% | 0% | 0% | 100% | 100% | 0% | 0% | 0% | 0% |
| Period 6 | 100% | 0% | 0% | 0% | 0% | 0% | 0% | 0% | 0% | 100% |

FIG. 5D

| 518 | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 100% | 100% | 100% | 0% | 0% | 0% | 0% | 0% | 0% | 0% |
| Period 2 | 0% | 0% | 0% | 100% | 100% | 100% | 0% | 0% | 0% | 0% |
| Period 3 | 0% | 0% | 0% | 0% | 0% | 0% | 100% | 100% | 100% | 100% |
| Period 4 | 100% | 100% | 100% | 100% | 100% | 0% | 0% | 0% | 0% | 0% |
| Period 5 | 0% | 0% | 0% | 0% | 0% | 100% | 100% | 100% | 0% | 0% |
| Period 6 | 0% | 0% | 100% | 100% | 0% | 0% | 0% | 0% | 100% | 100% |
| Period 7 | 100% | 0% | 0% | 0% | 100% | 100% | 0% | 0% | 0% | 0% |
| Period 8 | 0% | 100% | 100% | 100% | 0% | 0% | 100% | 100% | 100% | 100% |
| Period 9 | 0% | 0% | 0% | 0% | 100% | 100% | 0% | 0% | 0% | 0% |
| Period 10 | 0% | 0% | 0% | 0% | 0% | 0% | 0% | 0% | 0% | 0% |
| Period 11 | 100% | 100% | 100% | 0% | 0% | 0% | 0% | 0% | 0% | 0% |

FIG. 5E

| | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 100% | 100% | 100% | 100% | 0% | 0% | 0% | 0% | 0% | 0% |
| Period 2 | 0% | 0% | 0% | 0% | 100% | 100% | 100% | 100% | 0% | 0% |
| Period 3 | 100% | 100% | 0% | 0% | 0% | 0% | 0% | 0% | 100% | 100% |
| Period 4 | 0% | 0% | 100% | 100% | 100% | 100% | 0% | 0% | 0% | 0% |
| Period 5 | 0% | 0% | 0% | 0% | 0% | 0% | 100% | 100% | 100% | 100% |
| Period 6 | 100% | 100% | 100% | 100% | 0% | 0% | 0% | 0% | 0% | 0% |

FIG. 5F

| | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 100% | 100% | 100% | 100% | 100% | 0% | 0% | 0% | 0% | 0% |
| Period 2 | 0% | 0% | 0% | 0% | 0% | 100% | 100% | 100% | 100% | 100% |
| Period 3 | 100% | 100% | 100% | 100% | 100% | 0% | 0% | 0% | 0% | 0% |

| | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 0% | 0% | 0% | 0% | 100% | 100% | 100% | 100% | 100% | 100% |
| Period 2 | 100% | 100% | 100% | 100% | 0% | 0% | 0% | 0% | 100% | 100% |
| Period 3 | 0% | 0% | 100% | 100% | 0% | 100% | 100% | 100% | 0% | 0% |
| Period 4 | 100% | 100% | 0% | 0% | 100% | 0% | 100% | 0% | 100% | 100% |
| Period 5 | 100% | 100% | 100% | 100% | 100% | 100% | 100% | 0% | 0% | 0% |
| Period 6 | 0% | 0% | 0% | 0% | 100% | 100% | 100% | 100% | 100% | 100% |

FIG. 5H

| | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 0% | 0% | 0% | 100% | 100% | 100% | 100% | 100% | 100% | 100% |
| Period 2 | 100% | 100% | 100% | 0% | 0% | 0% | 100% | 100% | 100% | 100% |
| Period 3 | 100% | 100% | 100% | 100% | 100% | 100% | 0% | 0% | 0% | 0% |
| Period 4 | 0% | 0% | 0% | 0% | 0% | 100% | 100% | 100% | 100% | 100% |
| Period 5 | 100% | 100% | 100% | 100% | 100% | 0% | 0% | 0% | 0% | 100% |
| Period 6 | 100% | 100% | 100% | 100% | 100% | 100% | 100% | 100% | 100% | 0% |
| Period 7 | 0% | 0% | 0% | 0% | 0% | 0% | 100% | 100% | 100% | 100% |
| Period 8 | 100% | 100% | 100% | 100% | 100% | 100% | 100% | 100% | 100% | 100% |
| Period 9 | 100% | 100% | 100% | 100% | 0% | 0% | 0% | 0% | 0% | 0% |
| Period 10 | 100% | 100% | 100% | 100% | 100% | 100% | 100% | 100% | 100% | 100% |
| Period 11 | 0% | 0% | 0% | 100% | 100% | 100% | 100% | 100% | 100% | 100% |

| | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 0% | 0% | 100% | 100% | 100% | 100% | 100% | 100% | 100% | 100% |
| Period 2 | 100% | 100% | 0% | 0% | 100% | 100% | 100% | 100% | 100% | 100% |
| Period 3 | 100% | 100% | 100% | 100% | 0% | 0% | 100% | 100% | 100% | 100% |
| Period 4 | 100% | 100% | 100% | 100% | 100% | 100% | 0% | 0% | 100% | 100% |
| Period 5 | 100% | 100% | 100% | 100% | 100% | 100% | 100% | 100% | 0% | 0% |
| Period 6 | 0% | 0% | 100% | 100% | 100% | 100% | 100% | 100% | 100% | 100% |

| | Control signal 1 | Control signal 2 | Control signal 3 | Control signal 4 | Control signal 5 | Control signal 6 | Control signal 7 | Control signal 8 | Control signal 9 | Control signal 10 |
|---|---|---|---|---|---|---|---|---|---|---|
| Period 1 | 0% | 100% | 100% | 100% | 100% | 100% | 100% | 100% | 100% | 100% |
| Period 2 | 100% | 0% | 100% | 100% | 100% | 100% | 100% | 100% | 100% | 100% |
| Period 3 | 100% | 100% | 0% | 100% | 100% | 100% | 100% | 100% | 100% | 100% |
| Period 4 | 100% | 100% | 100% | 0% | 100% | 100% | 100% | 100% | 100% | 100% |
| Period 5 | 100% | 100% | 100% | 100% | 0% | 100% | 100% | 100% | 100% | 100% |
| Period 6 | 100% | 100% | 100% | 100% | 100% | 0% | 100% | 100% | 100% | 100% |
| Period 7 | 100% | 100% | 100% | 100% | 100% | 100% | 0% | 100% | 100% | 100% |
| Period 8 | 100% | 100% | 100% | 100% | 100% | 100% | 100% | 0% | 100% | 100% |
| Period 9 | 100% | 100% | 100% | 100% | 100% | 100% | 100% | 100% | 0% | 100% |
| Period 10 | 100% | 100% | 100% | 100% | 100% | 100% | 100% | 100% | 100% | 0% |
| Period 11 | 0% | 100% | 100% | 100% | 100% | 100% | 100% | 100% | 100% | 100% |

SYSTEMS AND METHODS FOR OPTIMIZED LOADING OF BATTERY INVERTERS

BACKGROUND

Energy storage systems (ESS) are widely used to store electrical energy for delivery and/or consumption at a later time. This increased usage has been largely driven by a dramatic reduction in the cost of lithium-ion batteries, particularly between 2010 and 2018; and by a dramatic and continuing increase in the deployment of renewable energy technologies, some of which (e.g., wind and solar) are intermittent and at least somewhat unpredictable in their pattern of energy production. However, the growth of demand for energy storage has led to increased research into forms of ESS based on technologies other than lithium-ion batteries.

Some ESS, including lithium-ion batteries, are inherently associated with direct current (DC). In contrast, the electrical grid, in many places, uses alternating current (AC). An ESS that is associated with DC can be a DC-ESS. An ESS that is associated with AC can be an AC-ESS. When a DC-ESS is charged from an AC source such as the electrical grid, it is necessary to use a rectifier to convert the AC source energy to DC for the DC-ESS; and when a DC-ESS is used to deliver energy to an AC load (such as the electrical grid), it is necessary to use an inverter to convert the DC source energy to AC for the load. It is common to use a combined rectifier-inverter device between a DC-ESS and an AC source/load so that energy flowing from AC to DC is rectified and energy flowing from DC to AC is inverted. These bidirectional devices are commonly referred to as battery inverters because of their association with lithium-ion batteries. However, they could be used with other forms of DC-ESS also.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 5B illustrates a schedule for switching between active energy storage units, according to some embodiments;

FIG. 5C illustrates a schedule for switching between active energy storage units, according to some embodiments;

FIG. 5D illustrates a schedule for switching between active energy storage units, according to some embodiments;

FIG. 5E illustrates a schedule for switching between active energy storage units, according to some embodiments;

FIG. 5F illustrates a schedule for switching between active energy storage units, according to some embodiments;

FIG. 5G illustrates a schedule for switching between active energy storage units, according to some embodiments;

FIG. 5H illustrates a schedule for switching between active energy storage units, according to some embodiments;

FIG. 5I illustrates a schedule for switching between active energy storage units, according to some embodiments;

FIG. 5J illustrates a schedule for switching between active energy storage units, according to some embodiments;

FIG. 5K illustrates a schedule for switching between active energy storage units, according to some embodiments;

FIG. 8B illustrates a schedule for switching energy storage units between inverters, according to some embodiments.

Figure 1A:
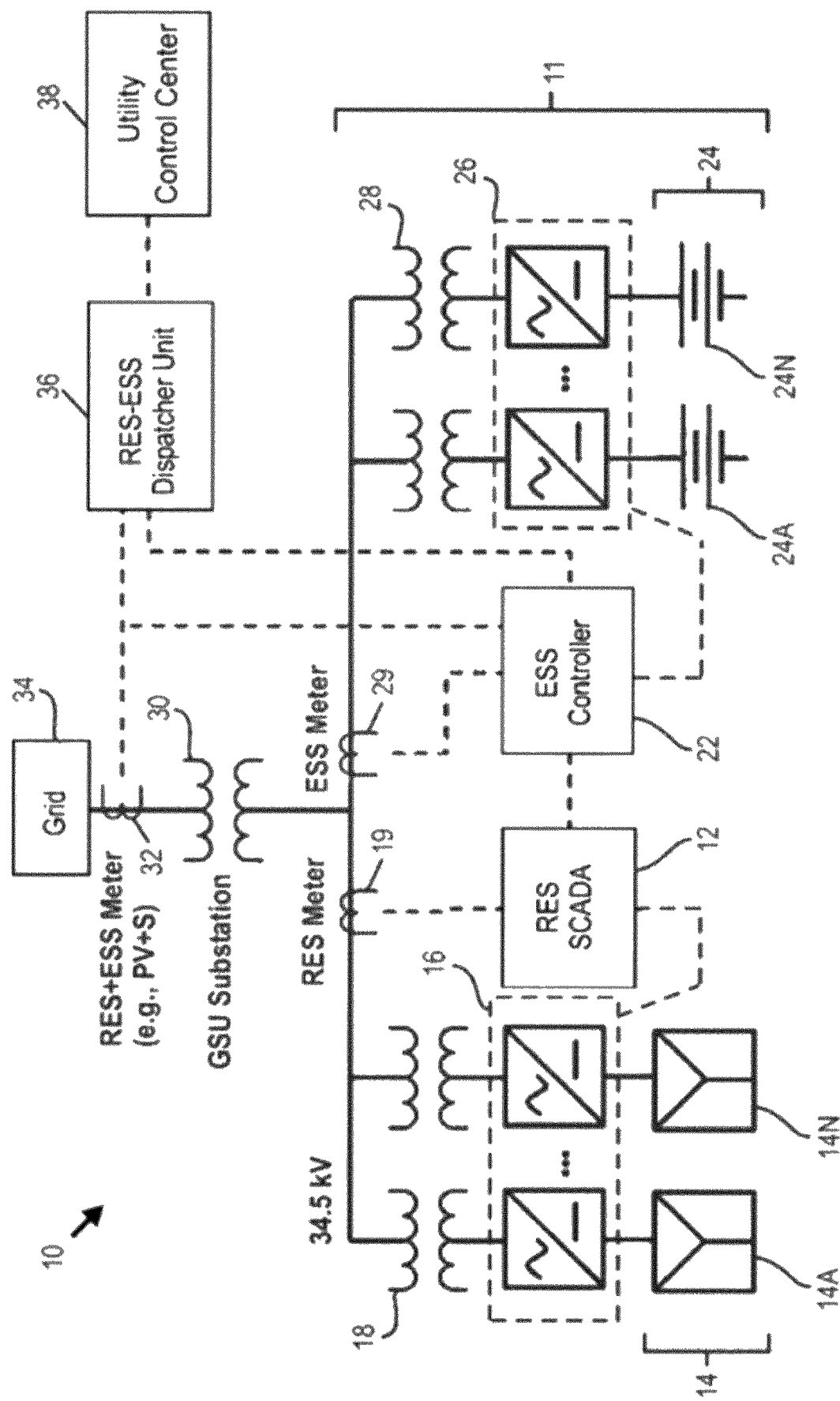
FIG. 1A is a schematic diagram of a metering and control system for controlling a renewable energy source and an energy storage system, according to some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Battery inverters (e.g., inverters that convert DC current from batteries to AC current), like other inverters, can produce heat when in use. This heat production can represent energy loss, and thus cause the efficiency of energy transfer from AC to DC or DC to AC to be less than 100%. In addition, the efficiency may vary depending on the power flowing through the inverters. The highest efficiency can occur when the power flow is close to the maximum rated power of the battery inverter and lower when the power flow is less than the maximum rated power, (e.g., at partial power). One reason for the phenomenon of efficiency decreasing at lower power flows can be that there is a minimum power requirement to operate the inverter itself (the so-called "no-load loss" or NLL). At low power levels, the no-load loss can be significant relative to the power throughput of the device, which can result in a low total efficiency. Accordingly, not only is it advantageous to operate battery inverters at close to their maximum power, but it is advantageous, where possible, to shut off individual devices to discontinue their no-load power losses.

In energy storage systems, the total energy stored can be partitioned among multiple energy storage units (ESUs) because storing all the energy in a single unit could require a unit that is cumbersomely large. Similarly, rather than use a single battery inverter with a power capacity equal to the total power capacity of the ESS, multiple battery inverters can be used to partition the power capacity of the ESS among them.

In some cases, a plurality of inverters can be coupled with a plurality of ESUs to power a single load. The load may have different load requirements over time, in some cases requiring a 100% power output from the ESUs, in some cases requiring a partial power output from the ESUs. Given the varying power requirements of such a load, it can be difficult to control the ESUs and/or inverters to meet the power requirements of the load while operating the inverters as efficiently as possible. Additionally, it can be difficult to balance the states of charge of the ESUs connected with the inverters to maintain the health of the ESS.

A system implementing the systems and methods described herein can address the different powering needs of a load and the requirements of the inverters and/or ESUs. In one example, the system can be configured to operate using a round-robin technique. For instance, energy storage units can be grouped with inverters into energy storage unit groups that can each include one or more energy storage units and one or more inverters coupled to the one or more energy storage units of the same energy storage unit groups. The inverters of the energy storage unit groups can be connected or otherwise coupled with a load. The energy storage units can be grouped into sets of energy storage unit groups that can each include one or more energy storage units and/or one or more inverters. The energy storage unit groups in each set can be operated in parallel according to power commands that the energy storage unit groups of the same set can receive in parallel. The power commands (e.g., control signals) sent to the energy storage unit groups can be selected such that each group is operated either a) as close as possible to the power level that causes the associated battery inverter(s) to operate at their maximum efficiency point, or as close as possible to a zero power level. The power commands can switch between energy storage unit groups in sequence to balance the states of charge of the energy storage units within the individual energy storage unit groups.

In another example, the system can be configured to operate using a switched battery method. The switched battery method can be useful, for example, when the maximum efficiency of different energy storage units may occur at different percentages of the energy storage units' rated power than the percentage of rated power that maximizes the efficiency of the battery inverters coupled with the energy storage units. In the switched battery method, individual energy storage units can be connected to battery inverters through a switching system. The switching system can be configured to connect the energy storage units in different configurations or positions. A processor can send or transmit control signals to the switching system to control the switches that connect the energy storage units with the inverters. The processor can control the switching system to connect the energy storage units with the inverters based on the load requirements of a load coupled with the energy storage units through the battery inverters. The processor can change the positions of the switches of the switching system to connect the energy storage units with different battery inverters over time. The processor can control the positions of the switches to minimize the amount of energy any single energy storage unit is discharging to an inverter while maximizing the amount of energy any single inverter (e.g., active inverter) is receiving up to the power capacity or power rating of the individual inverters. The processor can control the inverters to only be powered on when the inverters are connected to at least one energy storage unit. Accordingly, the processor can control the switching system to maximize the efficiency of both the energy storage units and the battery inverters.

Battery Inverter Load Management System

Referring now to FIG. 1A, a schematic diagram showing interconnections between various components of an AC coupled metering and control system 10 for controlling a renewable electrical energy generation device 14 including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES-ESS facility 11 is shown, according to one embodiment. N can be the same or different between the generation units 14A-14N and the energy storage units 24A-24N. The RES-ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES-ESS facility 11 that uses inverters 16, 26 to convert DC power produced by a renewable electrical energy generation device 14 (e.g., a PV array in certain embodiments) or power released by the energy storage device 24 to AC power for coupling to an AC electrical grid 34 (e.g., a utility grid operated by a processor separate from the RES-ESS facility 11). In certain embodiments, the RES-ESS facility 11 may embody a DC-coupled RES-ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one electrolysis unit (e.g., configured to electrolyze water to release hydrogen) and a hydrogen storage unit (e.g., adsorbent media for releasably binding hydrogen, hydrogen storage vessels, and/or reversible chemical reactant vessels or beds). In certain embodiments, an energy storage device 24 may include electrical charge storage devices such as batteries, optionally augmented with capacitors.

In certain embodiments, a RES-ESS dispatcher unit 36 has the ability to control the charge or discharge of the energy storage device 24 (e.g., batteries) by communicating with an ESS controller 22. The ESS controller may be located in the RES-ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES-ESS dispatcher unit 36. In certain embodiments, a utility control center 38 (e.g., of an electric power utility or grid operator) may communicate with the RES-ESS dispatcher unit 36 using DNP3 and set different configuration options. Additionally, the RES-ESS dispatcher unit 36 may receive or generate an accurate renewable generation forecast (e.g., solar generation forecast).

As shown in FIG. 1A, certain embodiments may utilize readily available electric power meters, such as a RES+ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
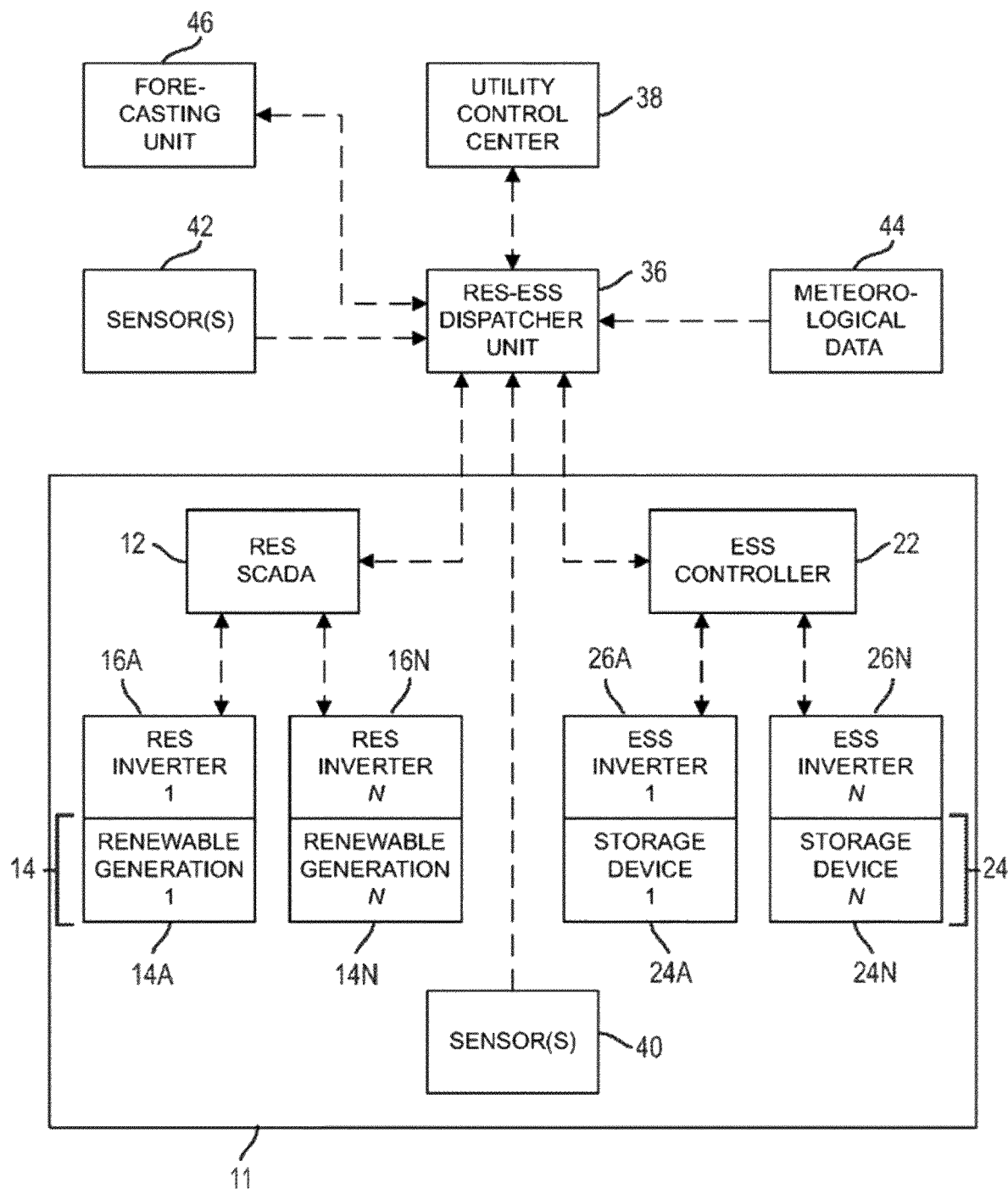
FIG. 1B is a schematic diagram showing certain components of the metering and control system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES-ESS dispatcher unit 36 may be arranged between a utility control center 38 and a RES-ESS facility 11. Within the RES-ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES-ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). In some embodiments, the RES-ESS facility 11 further includes at least one sensor 40, which may comprise one or more sky imaging sensors useful to determine sky conditions (such as the presence of clouds or lack thereof) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
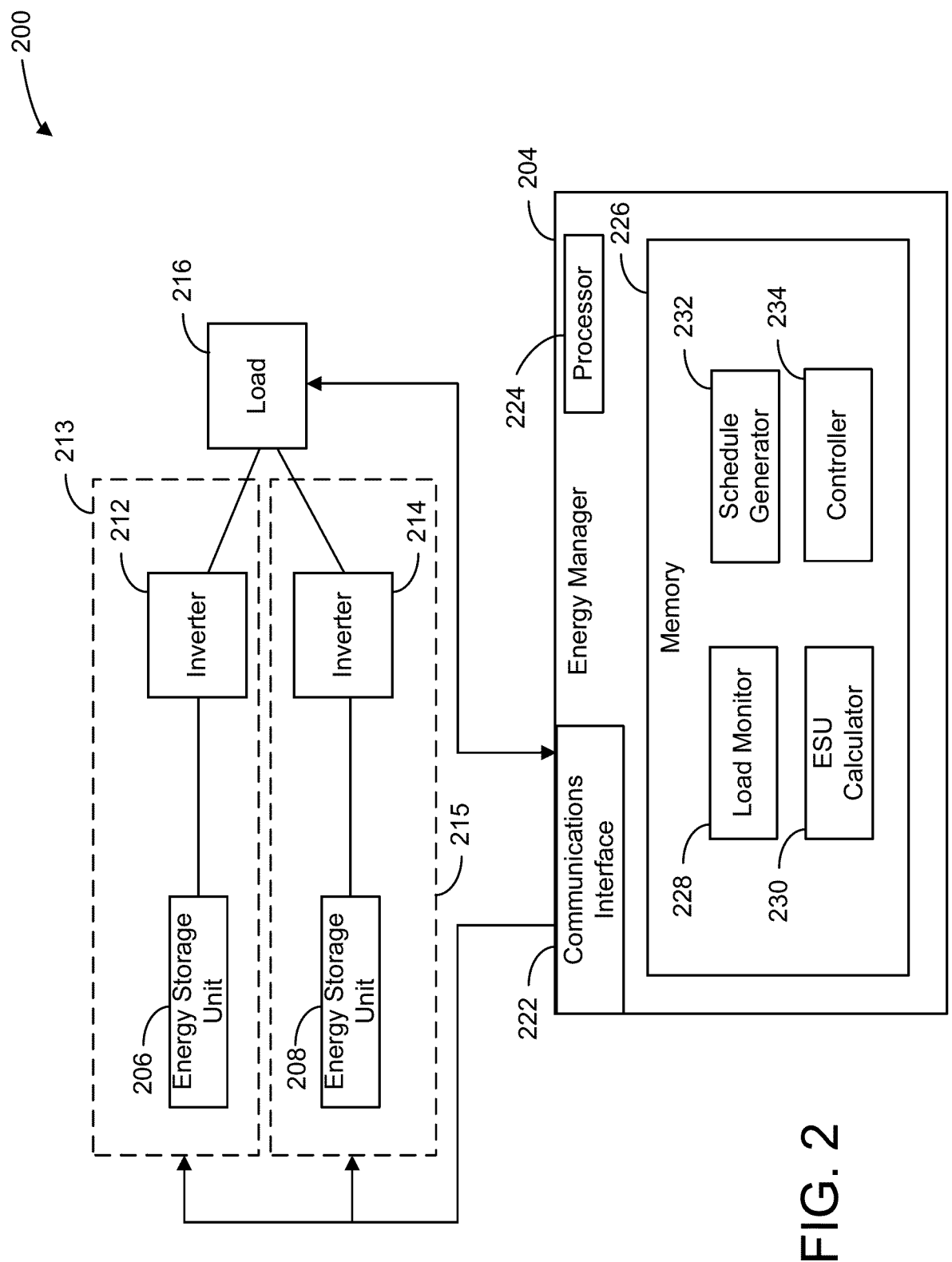
FIG. 2 illustrates a block diagram of an example system for controlling the energy output of energy storage units, according to some embodiments.

Referring now to FIG. 2, a block diagram of an example system 200 (e.g., an energy storage control system) for controlling the energy output of energy storage units is shown, according to some embodiments. The system 200 can be a system that operates within a renewable energy facility (e.g., the RES-ESS facility 11). In brief overview, the system 200 can include an energy manager 204, energy storage units 206 and 208, inverters 212 and 214, and a load 216. The inverters 212 and 214 can be coupled or connected with the load 216. The energy storage units 206 and 208 can be separately coupled or connected with the inverters 212 and 214. The energy storage units 206 and 208 can dispense or provide power to the load 216 through the inverters 212 and 214. The energy manager 204 can monitor the load 216 to determine the power or energy requirements of the load 216. Based on the power requirements of the load 216, the energy manager 204 can generate or establish a schedule indicating different energy storage units or different groups of energy storage units to power the load 216 for different time periods. In some cases, the schedule can indicate different inverters connected to the energy storage units to power the load 216 for different time periods. The energy manager 204 can generate the schedule to maximize the amount of energy one or more of the inverters provide to the load 216 for different time periods while minimizing the amount of energy the other inverters provide to the load 216 for the same time periods. The schedule can include a sequence of different energy storage unit groups to provide power to the load 216 over time to balance the states of the charge of the energy storage units of the energy storage unit groups. Thus, the energy manager 204 can optimize the efficiency of the inverters 212 and 214 and the energy storage units based on the power requirements of the load 216. The system 200 may include more, fewer, or different components than shown in FIG. 2. For example, there may be any number of client devices or computers that make up or are a part of the energy manager 204 or networks in the system 200. Further in some embodiments, the energy manager 204 can control the "on" or "off" state of the inverters 212 and 214.

The energy storage units 206 and 208 can each be or include one or more energy storage units. The energy storage units 206 and 208 can be the same as or similar to the energy storage units 24A-24N, shown and described with reference to FIGS. 1A and 1B. Each of the energy storage units 206 and 208 can be connected or coupled with a different one of the inverters 212 and/or 214. The system 200 can include any number of such energy storage units connected with the inverters 212 and/or 214.

The inverters 212 and 214 can be or include DC to AC converters. The inverters 212 and 214 can be the same as or similar to one or more of the inverters 26A-26N, shown and described with reference to FIGS. 1A and 1B. The inverters 212 and 214 can each include or be connected with a transformer. The inverters 212 and 214 can operate most efficiently when operating at or near (e.g., at a maximum operating efficiency of) the respective inverters' 212 and 214 maximum operating power. The inverters 212 and 214 can each receive DC power from the energy storage units 206 or 208. The inverters 212 and 214 can convert the DC power into AC power. The inverters 212 and 214 can output the converted power to the load 216. The system 200 can include any number of such inverters connected with the load 216 and/or with the energy storage units 206 and 208.

Energy storage units and inverters of the system 200 can be grouped into energy storage unit groups. For example, together, the energy storage unit 206 and the inverter 212 can form or be an energy storage unit group 213 and the energy storage unit 208 and the inverter 214 can form or be an energy storage unit group 215. The energy storage unit groups 213 and 215 can each include any number of energy storage units and/or any number of inverters. The energy storage units within the respective energy storage unit groups can be connected with each other in parallel. The inverters within the respective energy storage unit groups can be connected with each other in parallel. The inverters can be connected with the energy storage units in series within the same energy storage unit group. The energy storage unit groups of the system 200 together can form an energy storage system (ESS).

The load 216 can be any load that is powered by the output power of the inverters 212 and/or 214 (e.g., the energy storage unit groups 213 or 215) or that otherwise stores energy from the inverter 212 and/or 214. The load 216 can be powered by any number of inverters or energy storage unit groups. The load 216 can be a device (e.g., a heating, ventilation, or air conditioning unit) that operates from the power provided by the inverters 212 and/or 214 or can be an energy storage system, such as a battery (e.g., a battery energy storage system, or BESS) of a renewable energy facility (e.g., the RES–ESS facility 11) after converting the AC power back to DC power, or a power grid (e.g., the grid 34).

The energy manager 204 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The energy manager 204 can include or utilize at least one processing unit or other logic device such as a programmable logic array engine or a module configured to communicate with one another or other resources or databases. The components of the energy manager 204 can be separate components or a single component. The system 200 and its components can include hardware elements, such as one or more processors, logic devices, or circuits.

The energy manager 204 may comprise one or more processors that are configured to control the energy draw from or discharge of the energy storage units 206 and/or 208. The energy manager 204 may comprise a communications interface 222, a processor 224, and/or memory 226. The energy manager 204 may communicate with the energy storage units 206 and 208, the inverters 212 and 214, and/or devices measuring the power requirements of the load 216 via the communications interface 222. The processor 224 may be or include an ASIC, one or more FPGAs, a DSP, circuits containing one or more processing components, circuitry for supporting a microprocessor, a group of processing components, or other suitable electronic processing components. In some embodiments, the processor 224 may execute computer code or modules (e.g., executable code, object code, source code, script code, machine code, etc.) stored in the memory 226 to facilitate the activities described herein. The memory 226 may be any volatile or non-volatile computer-readable storage medium capable of storing data or computer code.

The memory 226 may include a load monitor 228, an ESU calculator 230, a schedule generator 232, and/or a controller 234. In brief overview, the components 228-234 can cooperate to monitor the energy requirements of the load 216. Based on the monitored load requirements, the components 228-234 can generate a schedule for controlling the discharge of or energy draw from the energy storage unit groups 213 and 215. Based on the schedule, the components 228-234 can control the energy draw from or discharge of the energy storage unit groups 213 and 215. In doing so, the components 228-234 can control the energy storage units 206 and 208 to selectively output power to the inverters 212 and/or 214. The components 228-234 can do so to select or optimize the amount of power that is directed to any individual inverter to increase the efficiency of operation of the inverters 212 and/or 214 while balancing the states of charge of the energy storage units 206 and 208.

The load monitor 228 may comprise programmable instructions that, upon execution, cause the processor 224 to monitor the power requirements of the load 216. For example, the load monitor 228 can retrieve measurements regarding the amount of power or energy the load 216 needs to operate from energy meters (e.g., the ESS electrical power meter 29) connected (e.g., connected in series) with the load 216. The load monitor 228 can communicate with the energy meters over a network, such as via the communications interface 222. The load monitor 228 can continuously monitor or poll the energy meters at set time intervals or pseudo-randomly to determine the power output of the energy storage units 206 and/or 208. In some embodiments, the energy meters can automatically transmit the measurements to the energy manager 204 at set intervals or pseudo-randomly. In some embodiments, the load monitor 228 can store the load requirement for the load 216 in memory and determine the load requirement by retrieving the load requirement from memory.

The ESU calculator 230 may comprise programmable instructions that, upon execution, cause the processor 224 to calculate the number of energy storage unit groups to power a load (e.g., the load 216). The ESU calculator 230 can determine or calculate the number of energy storage unit groups based on the required power of the load 216 (e.g., the required power as measured by the load monitor 228) and the rated power (e.g., the power capacity or the power level at which the energy storage unit groups operate the most efficiently) of the energy storage unit groups (e.g., the rated power of the inverters of the energy storage unit groups). For example, the ESU calculator 230 can store and identify the rated power of the energy storage unit groups 213 and 215 from the memory 226. The ESU calculator 230 can identify the load requirements identified by the load monitor 228. The ESU calculator 230 can compare the load requirements with the identified rated power. Based on the comparison, the ESU calculator 230 can determine a number (e.g., a number of a subset) of the energy storage unit groups 213 and 215 to power the load 216.

To determine the number of the energy storage unit groups 213 and 215, the ESU calculator 230 can divide the required power for the load 216 by the rated power of the ESS. The division can generate a percentage (e.g., a first value) of the rated power that is needed to power the load 216. The ESU calculator 230 can then multiply the percentage by a total number of the plurality of energy storage unit groups. The output of the multiplication can be the number (e.g., size) of energy storage unit groups that are needed to power the load 216. In cases in which the output of the multiplication is not a whole number (e.g., the output has at least one digit after a decimal), the ESU calculator 230 can round up to determine the number of energy storage unit groups. The ESU calculator 230 can use these functions, for example, assuming each of the energy storage unit groups has the same rated power.

The schedule generator 232 may comprise programmable instructions that, upon execution, cause the processor 224 to generate (e.g., establish) schedules (e.g., executable or non-executable files) for controlling energy storage unit groups to power a load (e.g., the load 216). For example, the schedule generator 232 can identify the determined number of energy storage unit groups to include in sets of energy storage unit groups. The schedule generator 232 can identify each energy storage unit group that is connected or coupled with the load 216 (e.g., the energy storage unit group 213 and the energy storage unit group 215). The schedule generator 232 can identify or determine different permutations or combinations of the number of energy storage unit groups connected with the load 216. Each permutation or combination can be a set of energy storage unit groups.

To generate a schedule for controlling energy storage unit groups to power a load, the schedule generator 232 can generate the schedule to have a round-robin format. For example, the schedule generator 232 can generate a schedule that includes a sequence with different time slots or time periods. The time slots or time periods can have any duration, such as a minute, an hour, or a day. In some cases, the schedule generator 232 can generate the schedule to have a number of time slots or time periods equal to the number of sets of energy storage unit groups that the schedule generator identifies (e.g., determine the number of time slots based on the number of sets of energy storage unit groups). The schedule generator 232 can insert a different set of groups of energy storage unit groups into each time slot or time period of the schedule to generate a schedule that includes a sequence of periods in which each period corresponds to a different set of energy storage unit groups. The schedule generator 232 can generate a schedule of sets of energy storage unit groups to power the load 216 from the set of energy storage unit groups by inserting identifications of the energy storage unit groups of each set in a sequence of time periods or time slots to which the sets of energy storage unit groups are assigned. By generating a schedule in this manner, the schedule generator 232 can ensure balance in the amount of energy that is stored in each energy storage unit group powering the load 216.

The controller 234 may comprise programmable instructions that, upon execution, cause the processor 224 to transmit (e.g., send) control signals to or otherwise control energy storage unit groups. The controller 234 can transmit control signals to the energy storage unit groups (e.g., the energy storage unit groups 213 and 215). The controller 234 can transmit the control signals to the individual energy storage units of the energy storage unit groups or to the inverters of the energy storage unit groups. Such control signals can cause the energy storage units of the energy storage unit groups to discharge energy or power to the inverters of the energy storage unit groups or the inverters to otherwise draw energy or power from the energy storage units of the respective energy storage unit groups. The inverters can receive the energy or power as DC current, convert or invert the power into AC current, and direct converted energy or power to the load 216. The control signals can also cause the energy storage units to stop discharging energy to the inverters or for the inverters to stop drawing energy from the energy storage units. Accordingly, by sending control signals to the individual energy storage unit groups (e.g., components of the individual energy storage unit groups), the controller 234 can control which energy storage unit groups power the load.

In one example, the controller 234 can control the energy discharge of energy storage unit groups by transmitting control signals to the inverters of the energy storage unit groups. For example, the controller 234 can transmit control signals that cause the switches of the inverters to connect or disconnect the inverters from the energy storage units coupled with the respective inverters. Connecting the switches can cause the inverters to draw power or energy from energy storage units connected with the inverters. Disconnecting the switches can cause the inverters to stop drawing power or energy from the energy storage units connected with the inverters. The inverters can include separate switches for each energy storage unit connected with the inverter such that the inverter can be controlled to separately connect or disconnect from individual energy storage units.

The controller 234 can control the energy storage unit groups according to a schedule (e.g., a schedule generated by the schedule generator 232). The controller 234 can operate according to the schedule based on the sets of energy storage unit groups and the time periods or time slots of the schedule. For example, the controller 234 can identify a first time period from the schedule. The first time period may be the first time period on the schedule or a time period that corresponds with a timestamp of the current time. The controller 234 can identify a first set of energy storage unit groups that corresponds with the first time period from the schedule. The controller 234 can identify the individual energy storage unit groups of the identified first set of energy storage unit groups. The controller 234 can transmit control signals (e.g., a first control signal or first one or more control signals) to the identified energy storage unit groups (e.g., to the inverters and/or the energy storage units of the identified set of energy storage unit groups) to cause each of the identified energy storage unit groups of the first set to provide power to the load 216 (e.g., to engage the first set of energy storage unit groups).

The controller 234 can maintain and monitor an internal clock. Based on the monitoring, the controller 234 can determine the first time period has ended and/or a second time period of the schedule has begun. Based on the determination, the controller 234 can identify a second set of energy unit groups that corresponds with the second time period. The controller 234 can identify the individual energy storage unit groups of the identified second set of energy storage unit groups. The controller 234 can transmit control signals (e.g., a second control signal or second one or more control signals) to the identified energy storage unit groups (e.g., to the inverters and/or the energy storage units of the identified set of energy storage unit groups) to cause each of the identified energy storage unit groups of the second set to provide power to the load 216 (e.g., to engage the second set of energy storage unit groups).

The controller 234 can repeat the process of monitoring an internal clock and determining when time periods of the schedule have ended and/or new time periods of the schedule have begun. For each change in time periods, the controller 234 can identify a new set of energy storage unit groups to power the load 216. The controller 234 can control each identified set accordingly. Upon reaching the end of the schedule (e.g., the last time period), the controller 234 can return to the first time period of the schedule and repeat the process for controlling sets of energy storage unit groups according to the schedule.

In some embodiments, the controller 234 can control the sets of energy storage unit groups such that only the inverters of the set energy storage unit groups that is operating to provide power to the load 216 are turned on. For example, when transmitting control signals to cause the first set of energy storage unit groups to provide power to the load 216, the controller 234 can additionally transmit control signals to any inverters of other energy storage unit groups that are turned on to turn them off. When transitioning to the second time period and using the second set of energy storage unit groups to power the load, the controller 234 can transmit control signals to power off or turn off any inverters from the first set of energy storage unit groups that are not included in the second set of energy storage unit groups. The controller 234 can similarly turn on or power on any inverters that were previously turned off when transitioning to power the load 216 with new energy storage unit groups.

The controller 234 can transmit control signals to cause the energy storage unit groups to operate at different percentages of the rated power for the respective energy storage unit groups. For example, when transmitting control signals to engage the first set of energy storage unit groups for the first time period, the controller 234 can configure the control signals to cause the inverters of the first set of energy storage unit groups to operate at 100% of the rated power of the respective inverters. The controller 234 can configure and transmit control signals to inverters not in the first set of energy storage unit groups to operate at 0% of the rated power of the respective inverters (e.g., to disengage the energy storage unit groups not in the first set of energy storage unit groups). Similarly, when transmitting control signals to engage the second set of energy storage unit groups for the second time period, the controller 234 can configure the control signals to cause the inverters of the second set of energy storage unit groups to operate at 100% of the rated power of the respective inverters. The controller 234 can configure and transmit control signals to the inverters not in the second set of energy storage unit groups to operate at 0% of the rated power of the respective inverters (e.g., to disengage the energy storage unit groups not in the second set of energy storage unit groups). In some embodiments, instead of using the rated power of the respective energy storage unit groups, the controller 234 can transmit control signals that cause the inverters to operate at 100% of a maximum efficiency power level (e.g., defined maximum efficiency power level) of the respective inverters. The controller 234 can retrieve the power rating or the maximum efficiency power levels of the inverters from memory to configure the control signals to do so. The controller 234 can cause the inverters to operate at any defined value.

In some cases, the controller 234 can transmit control signals to cause the energy storage unit groups to output less than 100% of their respective power ratings or maximum efficiency power levels. For example, the controller 234 can determine the required power of the load 216 is lower than a maximum operating power or a maximum efficiency power level of the first set of energy storage unit groups for the first time period. Responsive to the determination, the controller 234 can determine or identify an amount of power for each energy storage unit group of the first set to discharge to the load 216. The controller 234 can do so, for example, by identifying an equal amount of energy across each energy storage unit group of the first set of energy storage unit groups that will satisfy the load requirements of the load 216. The controller can send the control signals to the first set of energy storage unit groups to cause the first set of energy storage unit groups by sending the control signals to cause each energy storage unit group of the first set to provide the equal amount of energy to the load 216.

In another example, responsive to the determination that the required power of the load 216 is lower than a maximum operating power (e.g., rated power) or a maximum efficiency power level of the first set of energy storage unit groups for the first time period, the controller 234 can identify differing percentages of the maximum operating power or the maximum efficiency power level of the energy storage unit groups of the first set of energy storage unit groups. For instance, the controller 234 can divide the power requirements of the load 216 by the maximum operating power or the maximum power level of the individual energy storage unit groups to determine a first value. The controller 234 can multiply the first value by a total number of the energy storage unit groups to determine a number (e.g., a size) of energy storage unit groups. The whole number of the outcome of the multiplication can be the number of energy storage unit groups. The controller 234 can determine a remainder to be the value in the decimal point after the whole number in the outcome. The remainder can be a percentage of the maximum operating power or the maximum efficiency of an energy storage unit group. The controller 234 can generate the control signals for the first set of energy storage units to cause the determined number of energy storage unit groups of the first set of energy storage unit groups to each output 100 percent of the maximum operating power or the maximum efficiency power levels of the respective energy storage unit groups. The controller 234 can additionally configure the control signals to cause another energy storage unit group of the first set of energy storage unit groups to operate at the percentage of the maximum operating power or the maximum efficiency of the energy storage unit group equal to the remainder (e.g., to supply the remaining power to the load 216 to satisfy the power requirements of the load 216). In some cases, the energy storage unit group that supplies the remaining power can be the last energy storage unit group of the set to supply power such that each energy storage unit group of the set supplies power to the load 216.

In some embodiments, the energy manager 204 can adjust the schedule or generator or establish new schedules over time. The energy manager 204 can do so based on changes in the power requirements of the load 216. For example, the energy manager 204 can monitor the power requirements of the load 216 as the energy manager 204 is controlling the energy storage unit groups to provide power to the load 216. The power requirements of the load 216 can change over time because the load 216 may change between "on" and "off" states and otherwise change how the load 216 is operating (e.g., a heating, ventilation, and air conditioning device can increase or decrease the amount of energy it is using based on how close the setpoint for a temperature the device is attempting to accomplish is). The energy manager 204 can detect such changes based on the monitoring or based on inputs from the devices or another computer. Upon detecting energy requirements or a change in energy requirements that satisfies a criterion (e.g., an increase or decrease by a threshold amount or energy requirements that enter a defined range or above or below a threshold), the schedule generator 232 can generate or establish a new schedule for controlling the energy storage unit groups of the system 200 as described herein. The controller 234 can control the energy storage unit groups of the system 200 according to the schedule as described herein. Thus, the energy manager 204 can continuously adapt to changes in the power requirements of loads of a system while maintaining the efficiency of the energy storage system that is providing power to the loads.

Figure 3:
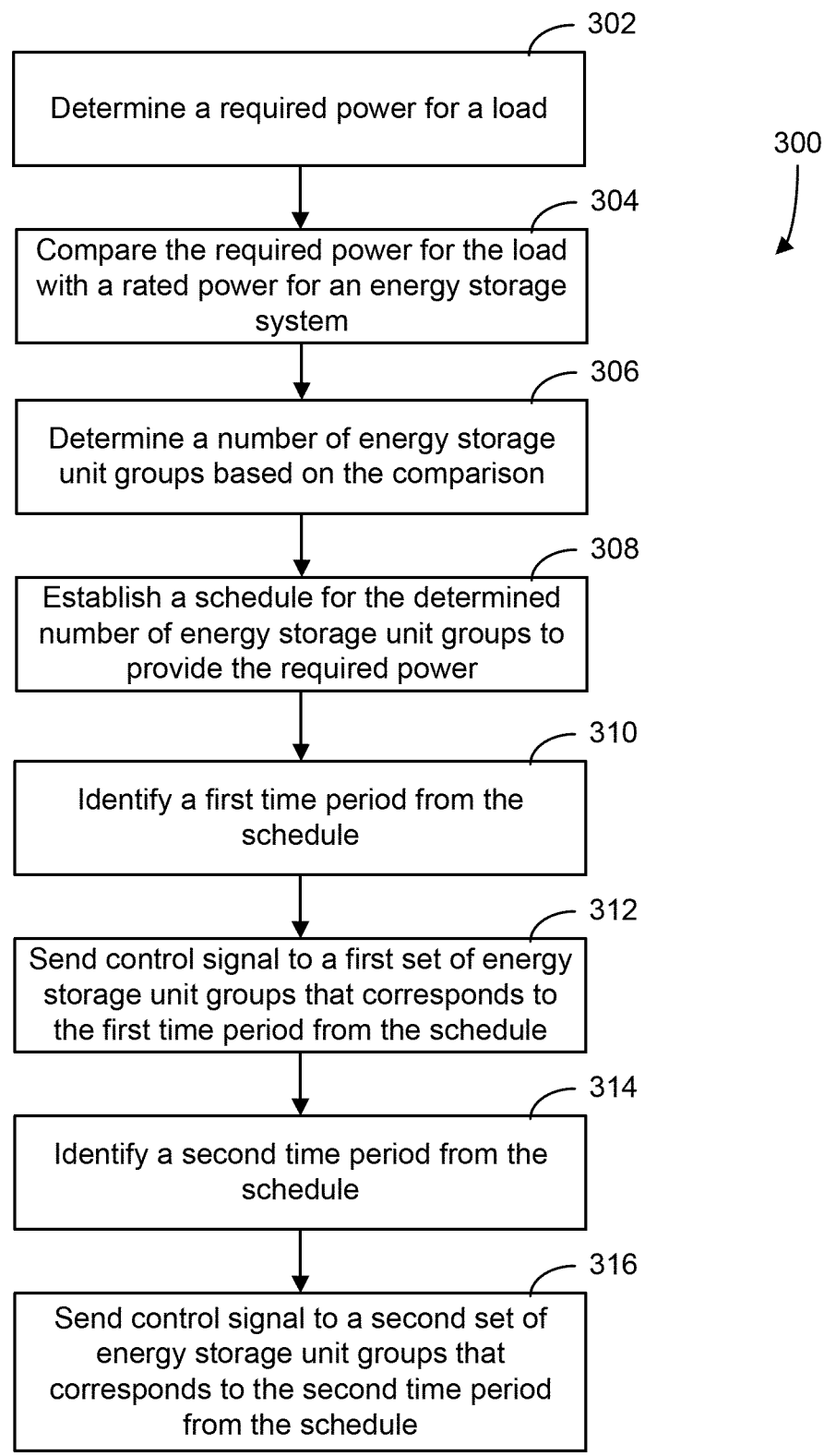
FIG. 3 illustrates a flowchart of an example method for controlling the energy output of energy storage units, according to some embodiments.

FIG. 3 illustrates a method 300 (e.g., a process) for controlling the energy output of energy storage units, according to some embodiments. The method 300 can be performed by a data processing system (e.g., a controller, the RES–ESS dispatcher unit 36, the ESS controller 22, the RES SCADA controller 12, the computing device 900, the energy manager 204, etc.). In some embodiments, the data processing system is the controller of a renewable energy plant that contains one or more energy storage unit groups (e.g., the energy storage unit groups 213 and/or 215) that power a load (e.g., the load 216). The data processing system may control the individual energy storage unit groups by selectively engaging and/or disengaging the energy storage unit groups to provide or stop providing power to the load according to a schedule. The data processing system can cause different sets of energy storage unit groups to power the load for different time periods. The data processing system can cycle through the different sets of energy storage unit groups to provide power to the load over time while the non-selected energy storage unit groups do not provide or stop providing power to the load. In doing so, the data processing system can maximize the amount of power engaged energy storage unit groups provide to the load, minimize the amount of power disengaged energy storage unit groups provide to the load, and balance the amount of energy that is stored in each energy storage unit group. Thus, the inverters and the energy storage units of the energy storage unit groups can operate efficiently while minimizing inefficiencies of no-load losses at the inverters and energy imbalances at the energy storage units.

At operation 302, the data processing system determines a required power for a load. The data processing system can determine the required power for the load by monitoring the load requirements or required power of the load. The data processing system can monitor the load requirements or the required power by polling or retrieving measurements from one or more meters that measure the power requirements of the load. In some embodiments, the data processing system can poll or retrieve a value from a meter that measures the amount of energy the load is receiving from an energy grid to determine the energy requirements of the device.

At operation 304, the data processing system compares the required power for the load with a rated power for an energy storage system. The rated power for the energy storage system can be a maximum power that energy storage unit groups can discharge (e.g., collectively discharge) to the load at a single point in time (e.g., instantaneously). The rated power can be stored in memory of the data processing system. The data processing system can retrieve the rated power from memory and compare the rated power with the required power that the data processing system determined in the operation 302.

At operation 306, the data processing system determines a number of energy storage unit groups based on the comparison. The data processing system can determine the number of energy storage unit groups by dividing the required power for the load by the rated power for the energy storage system to determine a first value. The data processing system can multiply the first value by the total number of energy storage unit groups that are in the energy storage system. The output of the multiplication can be a number of energy storage unit groups to use to provide power to the load to satisfy the power requirements of the load.

At operation 308, the data processing system establishes a schedule for the determined number of energy storage unit groups to provide the required power. The data processing system can establish the schedule by determining each permutation or combination of energy storage unit groups of the energy storage system that is possible with the determined number of energy storage unit groups. Each permutation or combination can be a set of energy storage unit groups. The schedule can be a file or record (e.g., a file, document, table, listing, message, notification, etc.) that includes different time periods for controlling the load. The data processing system can insert each set of energy storage unit groups into a different time period of the schedule.

At operation 310, the data processing system identifies a first time period from the schedule. The data processing system can identify the first time period as the first time period of the schedule or as a time period that includes a time stamp or a range of times that includes the current time at which the data processing system is identifying the first time period.

At operation 312, the data processing sends a control signal to a first set of energy storage unit groups that corresponds to the first time period from the schedule. The data processing system can identify the first set of energy storage unit groups from the schedule based on the first set of energy storage unit groups having a stored association with the first time period. The data processing system can send or transmit control signals to each energy storage unit group of the first set to cause the energy storage unit group to discharge power to the load for the first time period or engage the energy storage unit group. In some cases, the control signals can cause any energy storage unit groups or inverters of the first set of energy storage unit groups to change from an "off" state to an "on" state. In some cases, the data processing system can send or transmit control signals to the other energy storage unit groups connected or coupled to the load that are currently discharging power to the load to stop such energy storage unit groups from discharging power to the load or disengage the energy storage unit group. Such control signals can change the energy storage unit groups or the inverters of the energy storage unit groups to change from an "on" state to an "off" state.

At operation 314, the data processing system identifies a second time period from the schedule. The second time period can be next on the schedule after the first time period. The data processing system can identify the second time period responsive to determining the first time period has ended.

At operation 316, the data processing system sends a control signal to a second set of energy storage unit groups that corresponds to the second time period from the schedule. The data processing system can identify the second set of energy storage unit groups from the schedule based on the second set of energy storage unit groups having a stored association with the second time period. The data processing system can send or transmit control signals to each energy storage unit group of the second set to cause the energy storage unit group to discharge power to the load for the second time period or engage the energy storage unit group. In some cases, the control signals can cause any energy storage unit groups or inverters of the second set of energy storage unit groups to change from an "off" state to an "on" state. In some cases, the data processing system can send or transmit control signals to the other energy storage unit groups connected or coupled to the load that are currently discharging power to the load to stop such energy storage unit groups from discharging power to the load or otherwise disengage the energy storage unit groups. Such control signals can change the energy storage unit groups or the inverters of the energy storage unit groups from an "on" state to an "off" state.

Figure 4:
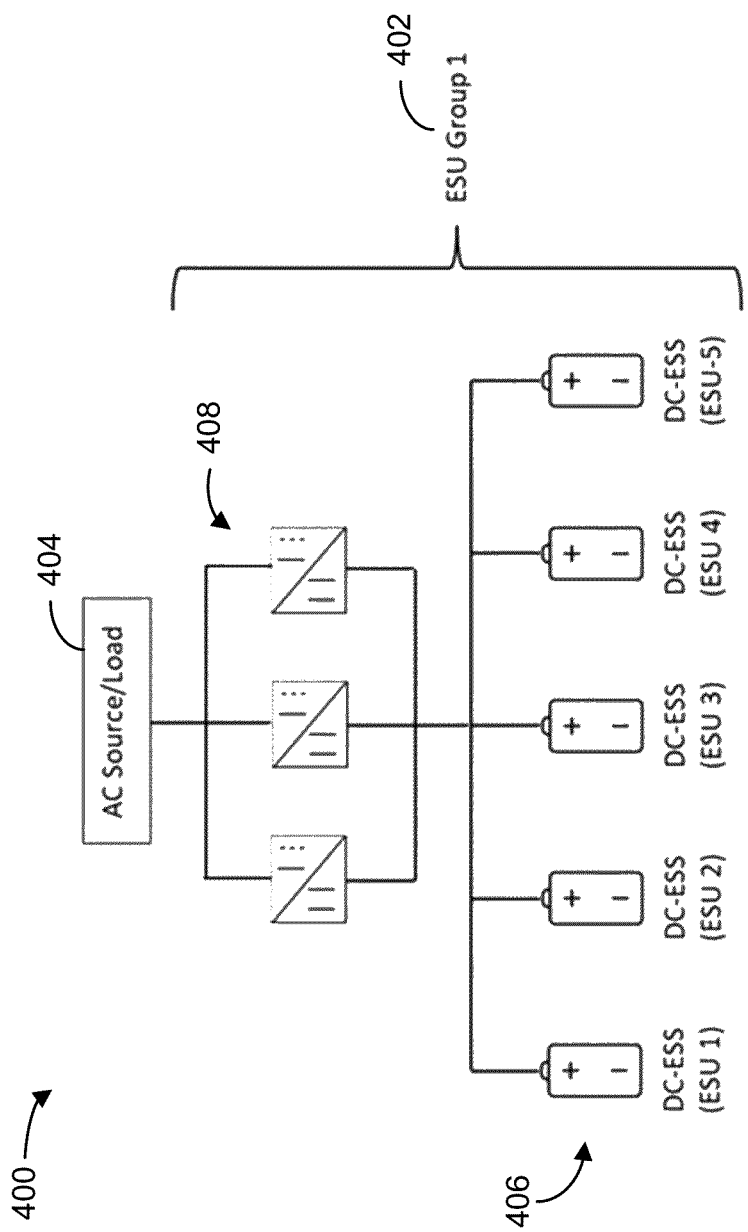
FIG. 4 illustrates a block diagram of an example system for controlling the energy output of energy storage units, according to some embodiments.

FIG. 4 illustrates a block diagram of an example system 400 for controlling the energy output of energy storage units, according to some embodiments. The elements of the system 400 can be the same as or similar to the elements shown and described with reference to FIG. 2. The system 400 can include an energy storage unit group 402 (e.g., an energy storage unit (ESU) group similar to or the same as the energy storage unit group 213 or 215) and a load 404. The energy storage unit group 402 can include one or more energy storage units 406 (e.g., energy storage units similar to or the same as the energy storage units 206 and/or 208) and/or one or more inverters 408 (e.g., battery inverters or inverters similar to or the same the inverters 212 and/or 214). The one or more energy storage units 406 can include any number of energy storage units. The one or more inverters 408 can include any number of inverters. The one or more energy storage units 406 can be connected in parallel with each other. The one or more energy storage units 406 can be connected to the one or more inverters 408. The one or more inverters 408 can be connected in parallel with each other. The one or more inverters 408 can be connected with the load 404. In operation, all or a subset of the one or more energy storage units 406, when activated or otherwise in an "on" state, can provide power or energy (e.g., DC power or energy) to all or a subset of the one or more inverters 408. The inverters 408 that receive the power or energy can convert the received power or energy into AC power or energy and direct the converted power or energy to the load 404. A controller (e.g., the energy manager 204) can control (e.g., based on a schedule) which, if any, of the one or more energy storage units 406 or one or more inverters 408 direct energy or power to the load 404.

Figure 5A:
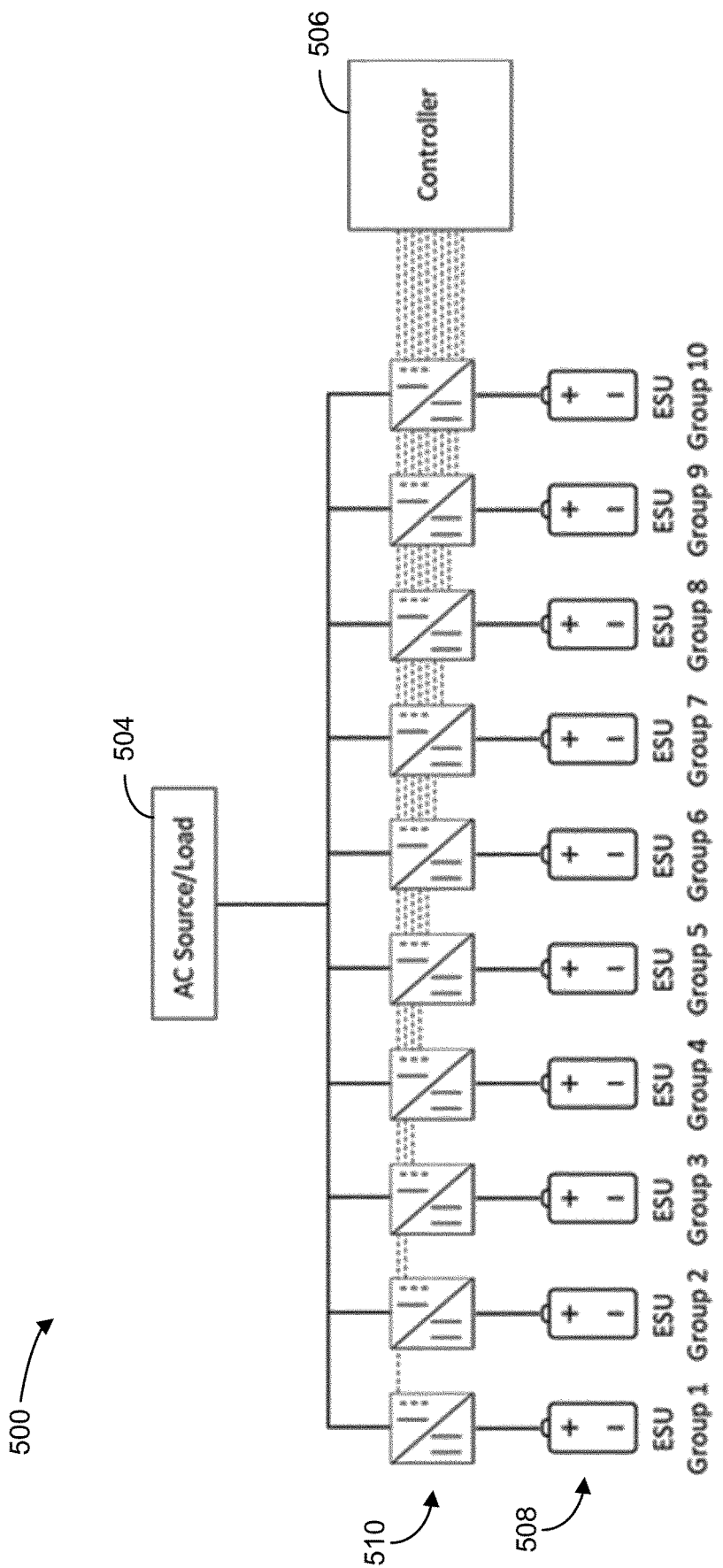
FIG. 5A illustrates a block diagram of an example system for controlling the energy output of energy storage units, according to some embodiments.

FIG. 5A illustrates a block diagram of an example system 500 for controlling the energy output of energy storage units, according to some embodiments. The elements of the system 500 can be the same as or similar to the elements shown and described with reference to FIG. 2 and/or FIG. 4. The system 500 can include one or more energy storage unit groups 502 (e.g., energy storage unit groups similar to or the same as the energy storage unit groups 213, 215, and/or 402), a load 504, (e.g., a load similar to or the same as the load 216 and/or 404), and/or a controller 506 (e.g., the energy manager 204). The one or more energy storage unit groups 502 can each include one or more energy storage units 508 and/or one or more inverters 510. Together, the one or more energy storage unit groups 502 can be an energy storage system (ESS). The energy storage units 508 of the individual energy storage unit groups 502 can each include one or more energy storage units (e.g., energy storage units connected in series, in parallel, or both). The inverters 510 of the individual energy storage unit groups 502 can each include one or more inverters (e.g., inverters connected in parallel with each other). The one or more energy storage unit groups 502 can include any number of energy storage unit groups.

The controller 506 can control which energy storage unit groups 502 provide power or energy to the load 504. The controller 506 can do so, for example, by sending control signals to the inverters 510 of the respective energy storage unit groups 502 to control which of the inverters 510 draw power from the energy storage units connected or coupled with the respective inverters 510. Such signals can cause changes in state of switches within the inverters 510 such that when a switch is connected, the inverter of the switch draws power from the energy storage unit or units connected to the inverter, and when a switch is not connected, the inverter of the switch does not draw power from the energy storage unit or units connected to the inverter. The controller 506 can transmit control signals to turn off any inverters that are not drawing energy from an energy storage unit and control signals to turn on any inverters that are drawing energy from an energy storage unit, thus reducing no-load losses.

The controller 506 can control which of the inverters (e.g., which of the energy storage unit groups) provide energy or power to the load 504 according to a schedule. For example, a schedule can indicate a number of energy storage units that are needed or necessary to provide power to the load. The schedule can indicate different periods (e.g., time periods) for different sets of the one or more energy storage units 502 to provide power or energy to the load 504. The individual sets can each have the needed or necessary number of energy storage units to satisfy the power requirements of the load 504. The controller 506 can determine or establish such a schedule based on the power requirements of the load 504 and/or the power rating of the energy storage unit groups 502 (e.g., by dividing the power requirements of the load 504 by the power rating of the energy storage unit groups 502). The controller 506 can determine and/or select different permutations of the number of needed or necessary number of energy storage units and insert the permutations into the different periods of the schedule. The controller 506 can operate the energy storage unit groups according to the schedule to satisfy (e.g., enable to operate) the power requirements of the load 504.

The energy storage unit groups 502 can then be operated to optimize the efficiency of the inverters 510. For instance, the controller 506 can send signals to each energy storage unit group 502 to discharge at a defined percentage of the maximum rate power of the respective energy storage unit groups 502. For example, each inverter 510 can operate at its highest efficiency when operating at the maximum rated power of the inverter 510. The one or more energy storage unit groups 502 can include ten energy storage unit groups or any number of energy storage unit groups. If the required total power of the load 504 is 10% (e.g., 1/10) of the rated power of the energy storage unit groups 502, only one energy storage unit group 502 would receive a signal to operate at 100% of its rated power, while all the other energy storage unit groups 502 would receive a signal to operate at 0% of their rated power. This would maximize the efficiency of the inverter(s) associated with the one active energy storage unit group 502 and would minimize the energy losses in all the other inverters (by shutting them down), thus maximizing the efficiency of the ESS as a whole. To ensure that the states of charge (SOCs) of the ten energy storage unit groups 502 are kept generally balanced, the 100% signal would be given to the individual energy storage unit groups 502 in turn, each for a short period. An example schedule that the controller 506 can establish and/or use to control the energy storage unit groups 502 in this manner is illustrated in FIG. 5B as schedule 512.

In another example, the required total power for the load 504 can be 20% (e.g., 2/10) of the rated power of the ESS. In this example, and assuming the one or more energy storage units 502 include ten energy storage unit groups, two energy storage unit groups 502 would receive a signal to operate at 100% of their rated power, while all the other energy storage unit groups 502 would receive a signal to operate at 0% of their rated power, and, in some cases, not only to operate at 0% of their rated power, but to shut down altogether, to reduce or eliminate their respective no-load losses. This would maximize the efficiency of the inverter(s) 510 associated with the two actives energy storage unit groups 502 and would minimize the energy losses in all the other inverters (e.g., by shutting them down), thus maximizing the efficiency of the ESS as a whole. Again, to ensure that the SOCs of the ten energy storage unit groups 502 are kept generally balanced, the 100% signal would be given to pairs of energy storage unit groups 502 in turn, each for a defined time period.

Example schedules that the controller 506 can establish or use to satisfy the power requirements of the load 504 when operating at 20% of the maximum power of the rated power of the ESS are illustrated in FIGS. 5C and 5D as schedules 514 and 516, respectively. The sequence in the schedule 514 can be converted to the sequence in the schedule 516 by re-ordering the columns (but not the rows) in the schedule 514. Such schedules can be generated to satisfy any power requirements of loads.

In other examples, if the required total power of the load 504 is 30% (e.g., 3/10), 40% (e.g., 4/10), or 50% (e.g., 5/10) of the rated power of the ESS, the controller can send a signal (e.g., a control signal or message) to three, four, or five energy storage unit groups 502, respectively, to operate at 100% of their rated power, while sending a signal to all of the remaining energy storage unit groups to operate at 0% of their rated power and, in some cases, to turn off. To ensure that SOCs of the ten energy storage unit groups 502 are kept generally balanced, the 100% signal would be given to three, four, or five energy storage unit groups 502 in rotation. The rotating round-robin technique with three or four energy storage unit groups 502 can require choosing a more complex rotation algorithm. For example, a three-energy storage unit group algorithm could be 1-2-3, 4-5-6, 7-8-9, 10-1-2, 3-4-5, 6-7-8, 9-10-1, 2-3-4, 5-6-7, 8-9-10, with this pattern then repeating. Similarly, a four-energy storage unit group algorithm could be 1-2-3-4, 5-6-7-8, 9-10-1-2, 3-4-5-6, 7-8-9-10 before repeating. A five-energy storage unit group algorithm could be 1-2-3-4-5, 6-7-8-9-10, thus effectively turning on and off the ten energy storage unit groups 502 in alternating groups of five. Example schedules for 30%, 40%, and 50% power requirements are respectively illustrated in FIGS. 5E, 5F, and 5G as schedules 518, 520, and 522.

In other examples, if the required total power of the load 504 is 60% (e.g., 6/10), 70% (e.g., 7/10) or 80% (e.g., 8/10) of the rated power of the ESS, the controller 506 can send signal to four, three, or two energy storage unit groups 502, respectively, to operate at 0% of their rated power and, in some cases, to turn off, while sending a signal to all of the remaining energy storage unit groups to operate at 100% of their rated power and, in some cases, to turn on. Example schedules for 60%, 70%, 80%, or 90% power requirements are respectively illustrated in FIGS. 5H, 5I, 5J, and 5K as schedules 524, 526, 528, and 530.

Figure 5L:
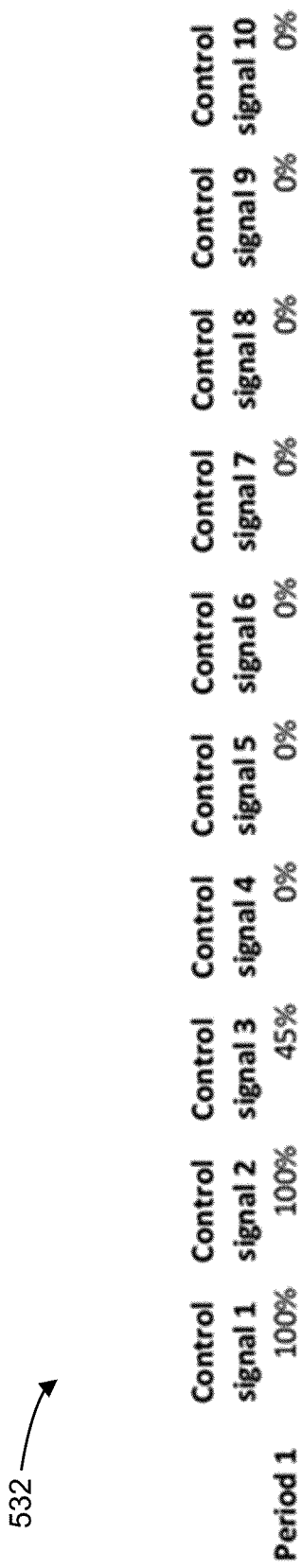
FIG. 5L illustrates a schedule for switching between active energy storage units, according to some embodiments.
Figure 5M:
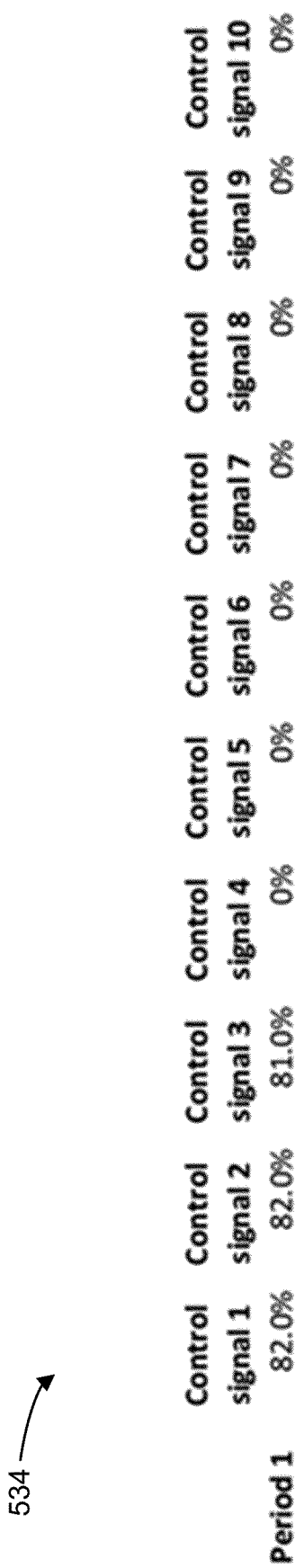
FIG. 5M illustrates a schedule for switching between active energy storage units, according to some embodiments.

In other examples, if the required power of the load 504 falls between 10% and 20%, or between 20% and 30%, etc., then the controller 506 could set (e.g., create or establish a schedule for) the required power level of one energy storage unit group 502 to deliver less than its full rated power, as illustrated in FIG. 5L in a schedule 532, or the controller 506 can select a number of energy storage unit groups 502 based on the higher full-10% end of the range and then slightly reduce the power signal to all the operating energy storage unit groups such that the selected energy storage unit groups 502 deliver less than their maximum rated power, as illustrated in FIG. 5M in a schedule 534. For example, to deliver 24.5% power the controller 506 can either a) operate two energy storage unit groups 502 at 100% power plus one energy storage unit group 502 at 45% power, or b) operate three energy storage unit groups 502 at approximately 2.45/3 of their maximum power, or 81-82%. The choice of whether to use option a) or b) to create or generate a schedule can depend on which option results in higher total-system efficiency (e.g., based on the efficiency-power curves of the inverters). It should be apparent that the examples above are valid for an arrangement with 10 energy storage unit groups 502, but that the same approach can be used for any number of energy storage unit groups 502.

In some cases, the maximum efficiency of the inverters 510 can occur at a power level other than 100% of the rated power of the inverters 510. In such cases, the same systems and methods as described above can be used but using the percentage or percentages at which the inverters operate at the maximum efficiency as the power rating of the inverters or the ESS instead of the maximum power rating. For example, if the maximum-efficiency power level of the inverters of an ESS is X % of the maximum rated power, then for power levels below X % the systems and methods as described above can be used but operating the active energy storage unit groups at X % of their rated power rather than at 100%. For power levels above X % (e.g., at Y % where Y>X), all of the energy storage unit groups could operate at Y % of their rated power.

Figure 6:
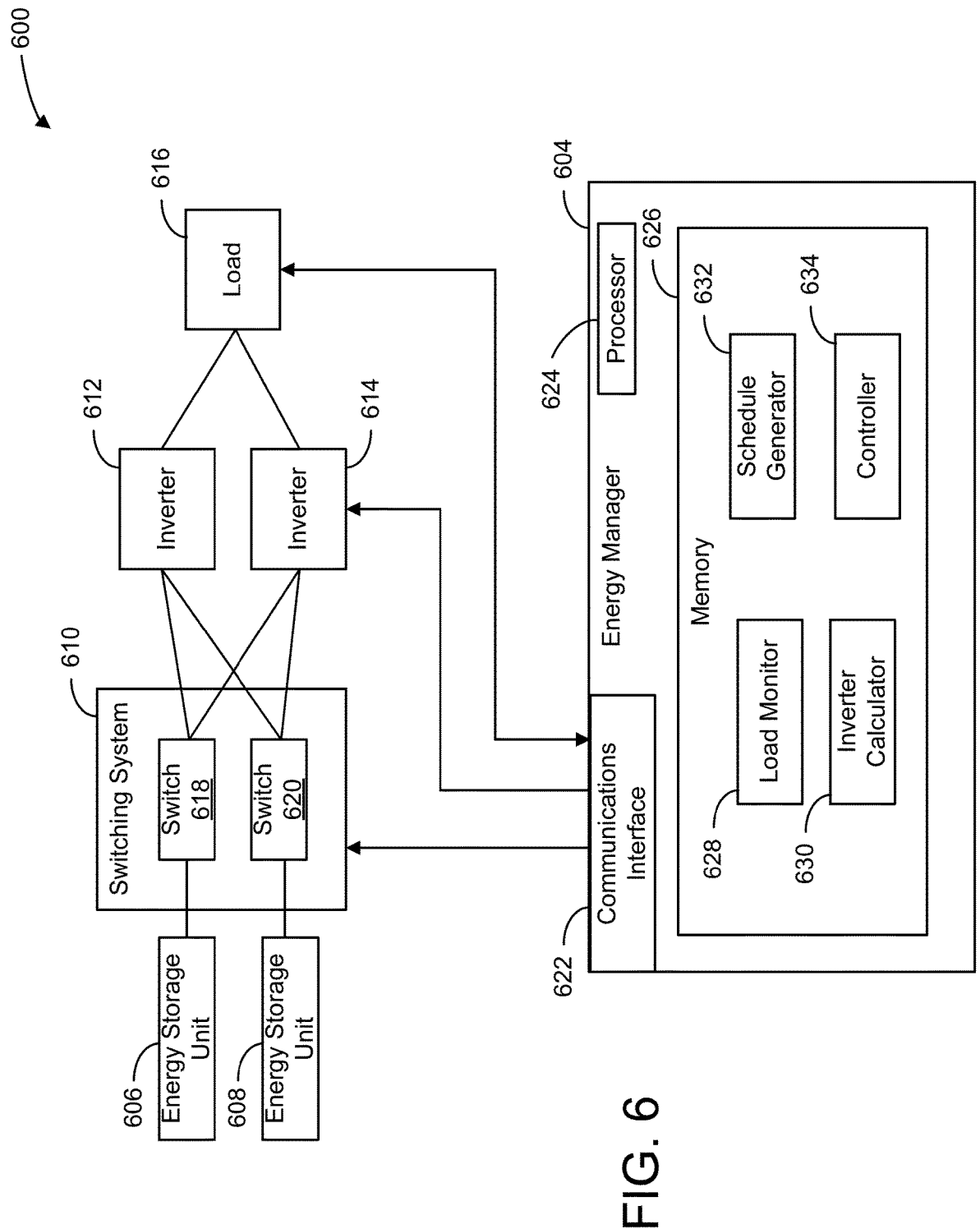
FIG. 6 illustrates a system for switching energy storage units between inverters, according to some embodiments.

FIG. 6 illustrates a system 600 (e.g., an energy storage control system) for switching energy storage units between inverters, according to some embodiments. In brief overview, the system 600 can include an energy manager 604, energy storage units 606 and 608, a switching system 610, inverters 612 and 614, and a load 616. The inverters 612 and 614 can be coupled or connected with the load 616. The energy storage units 606 and 608 can be selectively coupled or connected with the inverters 612 and 614 through the switching system. The energy storage units 606 and 608 can dispense or provide power to the load 616 through the switching system 610 and the inverters 612 and 614. The energy manager 604 can monitor the load 616 to determine the power or energy requirements of the load 616. Based on the power requirements of the load 616, the energy manager 604 can determine a number of inverters to power the load 616. Based on the number of inverters, the energy manager 604 can generate or establish a schedule indicating different energy storage units or different groups or energy storage units to connect with the number of inverters. The schedule can indicate switching positions of the switching system 610 to connect different sets of energy storage units to the number of inverters 612 and/or 614. The energy manager 604 can generate the schedule to maximize the amount of energy one or more of the inverters provide to the load 616 for different time periods while minimizing the amount of energy the other inverters provide to the load 616 for the same time periods. The energy manager 604 can generate the schedule to reduce the amount of power any individual energy storage unit is discharging to the inverters at one time. Thus, the energy manager 604 can optimize the efficiency of the energy storage units 606 and 608 and the inverters 612 and 614 based on the power requirements of the load 616. The system 600 may include more, fewer, or different components than shown in FIG. 6. For example, there may be any number of client devices or computers that make up or are a part of the energy manager 604 or networks in the system 600. Further in some embodiments, the energy manager 604 can control the "on" or "off" state of the inverters 612 and 614.

The components of the system 600 can be the same as or similar to the components of the system 200. The energy manager 604 can be the same as or similar to the energy manager 204. The energy storage units 606 and 608 can be the same as or similar to the energy storage units 206 and 208. The inverters 612 and 614 can be the same as or similar to the inverters 212 and 214. The load 616 can be the same as or similar to the load 216. The system 600 can include any number of inverters coupled with the load 616. The system 600 can include any number of energy storage units coupled with the inverters 612 and 614.

The switching system 610 can be configured to selectively connect the energy storage units 606 and/or 608 with the inverters 612 and/or 614. The switching system 610 can be or include switches 618 and 620 and/or any number of switches. The switching system 610 can connect the energy storage units 606 and/or 608 with the inverters 612 and 614 based on control signals that the switching system 610 receives from the energy manager 604. The switching system 610 can receive output power from the energy storage units 606 and/or 608 and direct or redirect the power to the inverters 612 and 614. The energy manager 604 can control the positions of the switches 618 and 620 (e.g., the position of the switching system 610) to control the direction of the output power from the energy storage units 606 and 608.

The energy manager 604 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The energy manager 604 can include or utilize at least one processing unit or other logic device such as a programmable logic array engine or a module configured to communicate with one another or other resources or databases. The components of the energy manager 604 can be separate components or a single component. The system 600 and its components can include hardware elements, such as one or more processors, logic devices, or circuits.

The energy manager 604 may comprise one or more processors that are configured to control the energy draw from or discharge of the energy storage units 606 and/or 608. The energy manager 604 may comprise a communications interface 622, a processor 624, and/or memory 626. The energy manager 604 may communicate with the energy storage units 606 and 608, the switching system 610, the inverters 612 and 614, and/or devices measuring the power requirements of the load 616 via the communications interface 622. The processor 624 may be or include an ASIC, one or more FPGAs, a DSP, circuits containing one or more processing components, circuitry for supporting a microprocessor, a group of processing components, or other suitable electronic processing components. In some embodiments, the processor 624 may execute computer code or modules (e.g., executable code, object code, source code, script code, machine code, etc.) stored in the memory 626 to facilitate the activities described herein. The memory 626 may be any volatile or non-volatile computer-readable storage medium capable of storing data or computer code.

The memory 626 may include a load monitor 628, an inverter calculator 630, a schedule generator 632, and a controller 634. In brief overview, the components 628-634 can cooperate to monitor the energy requirements of the load 616. Based on the monitored load requirements, the components 628-634 can generate a schedule for controlling the discharge or energy draw from the energy storage units 606 and 608. Based on the schedule, the components 628-634 can control the energy draw from or discharge of the energy storage units 606 and 608 to selectively output power to the inverters 612 and/or 614. The components 628-634 can do so to select or optimize the amount of power that is directed to any individual inverter to increase the efficiency of operation of the inverters 612 and/or 614 and/or the energy storage units 606 and 608.

The load monitor 628 may comprise programmable instructions that, upon execution, cause the processor 624 to monitor the power requirements of the load 616. For example, the load monitor 628 can retrieve measurements regarding the amount of power or energy the load 616 needs to operate from energy meters (e.g., the ESS electrical power meter 29) connected (e.g., connected in series) with the load 616. The load monitor 628 can communicate with the energy meters over a network, such as via the communications interface 622. The load monitor 628 can continuously monitor or poll the energy meters at set time intervals or pseudo-randomly to determine the power requirements of the load 616. In some embodiments, the energy meters can automatically transmit the measurements to the energy manager 604 at set intervals or pseudo-randomly. In some embodiments, the load monitor 628 can store the load requirement for the load 616 in memory and determine the load requirement by retrieving the load requirement from memory.

The inverter calculator 630 may comprise programmable instructions that, upon execution, cause the processor 624 to calculate the number of inverters to power a load (e.g., the load 616). The inverter calculator 630 can determine or calculate the number of inverters based on the required power of the load 616 (e.g., the required power as measured by the load monitor 628) and the rated power of the inverters 612 and 614 (e.g., the rated power of the inverters connected to the load 616). For example, the inverter calculator 630 can store and identify the rated power of the inverters 612 and 614 from the memory 626. The inverter calculator 630 can identify the load requirements identified by the load monitor 628. The inverter calculator 630 can compare the load requirements with the identified rated power. Based on the comparison, the inverter calculator 630 can determine a number (e.g., a number of a subset) of the inverters 612 and 614 to power the load 616.

To determine the number of the inverters 612 and 614, the inverter calculator 630 can divide the required power for the load 616 by the rated power of the inverters 612 and 614. The division can generate a percentage (e.g., a first value) of the rated power (e.g., the maximum power capacity of the inverters or the power capacity at which the inverters operate the most efficiently) that is needed to power the load 616. The inverter calculator 630 can then multiply the percentage by a total number of the plurality of energy storage units. The output of the multiplication can be the number of (e.g., size of) inverters that are needed to power the load 616. In cases in which the output of the multiplication is not a whole number (e.g., the output has at least one digit after a decimal), the inverter calculator 630 can round up to determine the number of inverters. The inverter calculator 630 can use these functions, for example, assuming each of the inverters has the same rated power.

The schedule generator 632 may comprise programmable instructions that, upon execution, cause the processor 624 to generate (e.g., establish) schedules (e.g., executable or non-executable files or records) for controlling the switching system 610 to power a load (e.g., the load 616). For example, the schedule generator 632 can identify the determined number of inverters to include in sets of inverters to power the load 616. The determined number can be any number between one and the total number of inverters coupled with the load 616. The schedule generator 632 can identify each inverter that is connected or coupled with the load 616 (e.g., the inverters 612 and 614). The schedule generator 632 can identify or determine different permutations or combinations of the number of inverters connected with the load 616. Each permutation or combination can be a set of inverters.

To generate a schedule for controlling a switching system to power a load, the schedule generator 632 can generate the schedule to have a round-robin format. For example, the schedule generator 632 can generate a schedule that includes a sequence with different time slots or time periods. The time slots or time periods can have any duration, such as a minute, an hour, or a day. In some cases, the schedule generator 632 can generate the schedule to have a number of time slots or time periods equal to the number of sets of inverters that the schedule generator identifies (e.g., determine the number of time slots based on the number of sets of energy storage unit groups). The schedule generator 632 can insert a different set of inverters into each time slot or time period of the schedule to generate a schedule that includes a sequence of periods in which each period corresponds to a different set of inverters. The schedule generator 632 can generate a schedule of sets of inverters to power the load 616 by inserting identifications of the inverters of each set in a sequence of time periods or time slots to which the sets of inverters are assigned. By generating a schedule in this manner, the schedule generator 632 can reduce the wear and tear of the inverters powering the load 616.

The schedule generator 632 can determine switching positions to connect energy storage units to connect with the inverters 612 and 614 for schedules that the schedule generator 632 generates. For example, in some cases, energy storage units can be the most efficient when operated at the lowest possible power and become less (e.g., monotonically less) efficient as their power level increases; while inverters can be the most efficient when operated at the highest possible power and become less (e.g., monotonically less) efficient as their power level decreases. Accordingly, the schedule generator 632 can determine switching positions for the switching system 610 that cause the energy storage units to operate (e.g., discharge power or energy) at the lowest possible power level and the active inverters to convert the power or energy received from the energy storage units at the highest possible power level (e.g., at the maximum power capacity or otherwise at the level at which the inverters are the most efficient).

To determine the switching positions of the switching system 610, the schedule generator 632 can identify positions to minimize the amount of energy or power individual energy storage units discharge to the inverters and maximize the amount of power individual inverters operate to convert from DC power to AC power. The schedule generator 632 can determine such switching positions based on the number of inverters the schedule generator 632 determined are required to satisfy the power requirements of the load 616. For example, the schedule generator 632 can determine only one inverter is needed to satisfy the power requirements of the load 616. Based on the determination, the schedule generator 632 can determine a switching position for the switching system 610 in which each energy storage unit connected with the switching system 610 is connected with the same single inverter. The schedule generator 632 can determine switching positions for the switching system 610 that separately cause the energy storage units to connect with each inverter connected with the load 616. The schedule generator 632 can generate data for the switching positions that indicate the states of the different switches of the switching system 610 for each switching position. The schedule generator 632 can store the data with identifications of the switching positions that correspond with the data. In each switching position, the power drawn from the energy storage units can be evenly drawn such that each energy storage unit is discharging the same but the lowest amount of power possible while still satisfying the power requirements of the load 616.

The schedule generator 632 can insert identifications of the respective switching positions into a schedule that can be used (e.g., by the controller 634) to operate the switching system 610. The schedule generator 632 can insert the identifications into different time periods of the schedule. The schedule generator 632 can insert a single identification for each switching position into the schedule to create a round-robin schedule in which the controller 634 switches between the different switching positions for the different time periods in sequence without repeating any switching position.

In another example, the schedule generator 632 can generate a schedule based on a determination that a number of multiple inverters is needed or necessary to power the load 616. In this example, the schedule generator 632 can determine a different subset of energy storage units to provide power or energy to each of the determined number of inverters. The schedule generator 632 can do so, for instance, by evenly dividing the total number of energy storage units by the determined number of inverters (e.g., if the total number of inverters is two, the schedule generator 632 can divide the total number of energy storage units by two) into subsets of energy storage units. The schedule generator 632 can determine a switching position of the switching system 610 in which each of the determined subsets of energy storage units is connected with a different inverter of the inverters connected with the load 616. Because the number of determined subsets of inverters can be equal to the number of inverters that is needed to power the load, the switching position can cause only the determined number of inverters to supply power to the load while leaving the other inverters "off," or otherwise not receive or discharge energy to the load 616. The schedule generator 632 can determine switching positions that cause the different subsets of energy storage units to be connected with different inverters in each switching position. The schedule generator 632 can generate data for the switching positions that indicate the states of the different switches of the switching system 610 for each switching position. The schedule generator 632 can store the data with identifications of the switching positions that correspond with the data. In each switching position, the power drawn from the energy storage units can be evenly drawn such that each energy storage unit is discharging the same but the lowest amount of power possible while still satisfying the power requirements of the load 616. The schedule generator 632 can insert the identifications of the switching positions in different time periods of a schedule to create, generate, or establish the schedule for controlling the switching system 610.

The controller 634 may comprise programmable instructions that, upon execution, cause the processor 624 to transmit (e.g., send) control signals to or otherwise control the switching system 610. The controller 634 can transmit control signals to the switching system 610. The controller 634 can transmit the control signals to the switching system 610 to change the state of switches (e.g., the switches 618 and/or 620). Each switch within the switching system 610 can be connected with an individual energy storage unit (or group of multiple energy storage units, which together can be an energy storage unit). The switches can be configured to connect the individual energy storage units with different inverters (e.g., the inverters 612 and/or 614). The controller 634 can transmit control signals to the switching system 610 to connect the energy storage units with different inverters.

The controller 634 can transmit control signals to the switching system 610 according to a schedule (e.g., a switching schedule). The schedule can be generated by the schedule generator 632 to satisfy the power requirements of the load 616. The controller 634 can operate according to the schedule based on the sets of energy storage unit groups and the time periods or time slots of the schedule. For example, the controller 634 can identify a first time period from the schedule. The first time period may be the first time period on the schedule or a time period that corresponds with a timestamp of the current time. The controller 634 can identify data of a switching position that corresponds with the first time period from the schedule. The controller 634 can transmit control signals (e.g., a first control signal or first one or more control signals) to the switching system 610 to cause the switching system 610 to connect energy storage units to inverters according to the switching position of the first time period of the schedule.

The controller 634 can maintain and monitor an internal clock. Based on the monitoring, the controller 634 can determine the first time period has ended and/or a second time period of the schedule has begun. Based on the determination, the controller 634 can identify a second switching position that corresponds with the second time period. The controller 634 can identify the data of the second switching position. The controller 634 can transmit control signals (e.g., a second control signal or second one or more control signals) to the switching system 610 to cause the energy storage units to connect with inverters according to the second switching position to provide power to the load 616.

The controller 634 can repeat the process of monitoring an internal clock and determining when time periods of the schedule have ended and/or new time periods of the schedule have begun. For each change in time periods, the controller 634 can identify a new switching position to use to power the load 616. The controller 634 can control the switching system 610 according to the identified switching positions accordingly. Upon reaching the end of the schedule (e.g., the last time period), the controller 634 can return to the first time period of the schedule and repeat the process for controlling switching system 610 according to the schedule.

In some embodiments, the controller 634 can control the inverters such that only the inverters that are providing power to the load 616 are turned on. For example, when transmitting control signals to change the switching position of the switching system 610, the controller 634 can identify (e.g., from the data regarding the switching positions from the schedule) the inverters that are receiving power and/or providing power to the load 616. The controller 634 can also identify the inverters that are not receiving power and/or providing power to the load 616. The controller 634 can transmit a control signal to change the state of the inverters such that any inverters that are receiving power or providing power to the load 616 are in an "on" state and any inverters that are not receiving power or providing power to the load 616 are in an "off" state. The controller 634 can send such control signals for each change switching position (e.g., for each time period of a schedule) to reduce the no-load losses of the inverters supplying power to the load 616.

In some embodiments, the energy manager 604 can adjust the schedule or generator or establish a new schedule over time. The energy manager 604 can do so based on changes in the power requirements of the load 616. For example, the energy manager 604 can monitor the power requirements of the load 616 as the energy manager 604 is controlling the energy storage unit groups to provide power to the load 616. The power requirements of the load 616 can change over time such as because the load 616 may change between "on" and "off" states or otherwise change how the load 616 is operating (e.g., a heating, ventilation, and air conditioning device can increase or decrease the amount of energy it is using based on how close the setpoint for a temperature the device is attempting to accomplish is). The energy manager 604 can detect such changes based on the monitoring or based on inputs from the devices or another computer. Upon detecting energy requirements or a change in energy requirements that satisfies a criterion (e.g., an increase or decrease by a threshold amount or energy requirements that enter a defined range or above or below a threshold), the schedule generator 632 can generate or establish a new schedule for controlling the switching position of the switching system as described herein. The controller 634 can control the energy storage unit groups of the system 600 according to the schedule as described herein. Thus, the energy manager 604 can continuously adapt to changes in the power requirements of loads of a system while maintaining the efficiency of the energy storage system that is providing power to the loads.

In some embodiments, the controller 634 can transmit control signals to energy storage units or inverters to control an amount of power or energy the energy storage units discharge to the inverters. For example, in a case in which the load 616 has power requirements of 50% of the power rating of the inverters 612 and 614 (e.g., 100% of the power rating of one of the inverters 612 or 614), the controller 634 can transmit a control signal to cause each of the energy storage units 606 and 608 to transmit 50% of the power capacity of the respective energy storage units 606 and 608 to the inverter 612 to fulfill the power requirements of the load 616. In another example, in a case in which the power requirements of the load 616 are 70% of the power rating of the inverters 612 and 614 (e.g., 100% of the power rating of the inverter 612 and 40% of the power rating of the inverter 614), the controller 634 can transmit a control signal to the energy storage units 606 and 608 to either (1) cause one of the energy storage units 606 or 608 to discharge 100% of the power capacity of the energy storage unit to one of the inverters 612 or 614 and another of the energy storage units 606 or 608 to discharge 40% of the power capacity of the other energy storage unit to the other inverter; or (2) cause the respective energy storage units 606 and 608 to respectively discharge 70% of their power capacity to respective inverters 612 and 614 (e.g., the energy storage unit 606 can discharge 70% of its power capacity to the inverter 612 and the energy storage unit 608 can discharge 70% of its power capacity to the inverter 614), depending on the configuration of the controller 634, for example. The controller 634 can determine amounts of power to discharge from individual energy storage units by, for example, calculating percentages that are even across the energy storage units, or that otherwise maximize the amount of power individual inverters (e.g., active or activated inverters) receive from the respective energy storage units.

In some embodiments, in addition to or instead of using a physical switching system, such as the switching system 610, the energy manager 604 can control the energy or power draw of the inverters 612 and 614 (and any other inverters of the renewable energy system) by operating the inverters 612 and 614 in different control positions. The control positions can each define or indicate which inverters draw power or energy from which energy storage unit 606 or 608. For example, the energy manager 604 can operate the inverters 612 and 614 in multiple different control positions. In a first control position, the energy manager 204 can transmit one or more control signals to the inverters 612 and/or 614 to cause the inverter 612 to draw power from both of the energy storage units 606 and 608 and to cause the inverter 614 not to draw power from any energy storage units. The energy manager 604 can operate the inverters 612 and 614 in the first control position in response to determining the power requirements of the load 616 are equal to 50% of the power rating of the inverters 612 and 614. In a second control position, the energy manager 604 can transmit one or more control signals to the inverters 612 and/or 614 to cause the inverter 612 to draw 30% of the power capacity of the energy storage unit 606 from the energy storage unit 606 and the inverter 614 to draw 30% of the power capacity of the energy storage unit 608 from the energy storage unit 608. The energy manager 604 can transmit such control signals to any number of inverters to draw any amount of power from any number of energy storage units. The energy manager 604 can do so according to a schedule as described above. In doing so, the energy manager 604 can cause any permutation of inverters to power the load 616.

When operating the inverters 612 and 614 using different control positions, the inverters 612 and 614 can be coupled or connected (e.g., directly coupled or connected) with the energy storage units 606 and 608. Accordingly, the energy manager 604 can control which inverters receive energy from which energy storage unit by controlling the inverters 612 and 614 and without changing a position of or transmitting signals to a physical switching system (e.g., the physical switching system 610), such as a physical switching external to the inverters 612 and 614. However, in some cases, the energy manager 604 can transmit control signals to the different inverters 612 and 614 in tandem with control signals to the switching system 610. Doing so, can cause the inverters 612 and 614 that are connected to the respective energy storage units 606 and 608 through the switching system 610 to draw energy from the connected energy storage units 606 and 608.

The descriptions herein regarding the different positions of the switching system 610 can also apply to the control positions of the inverters 612 and 614. For example, the energy manager 604 can control the energy draw of individual inverters 612 and 614 (and any other inverters of the system 600) using the same rules and/or criteria, such as to minimize the discharge of individual energy storage units while maximizing the draw of activated inverters. The energy manager 604 can control the energy draw of any number of inverters and from any number of energy storage units in any number of control positions in a similar manner to the manner described above with respect to controlling the position of the switching system 610. In doing so, the energy manager 604 may transmit control signals to inverters to turn on (e.g., activate or engage) and/or draw energy from different energy storage units in different control positions based on one or more thresholds of a schedule. The energy manager 604 can transmit control signals to the inverters that are not drawing energy from the different energy storage units to turn the inverters off (e.g., deactivate or disengage) to reduce any no-load losses of such inverters.

Figure 7A:
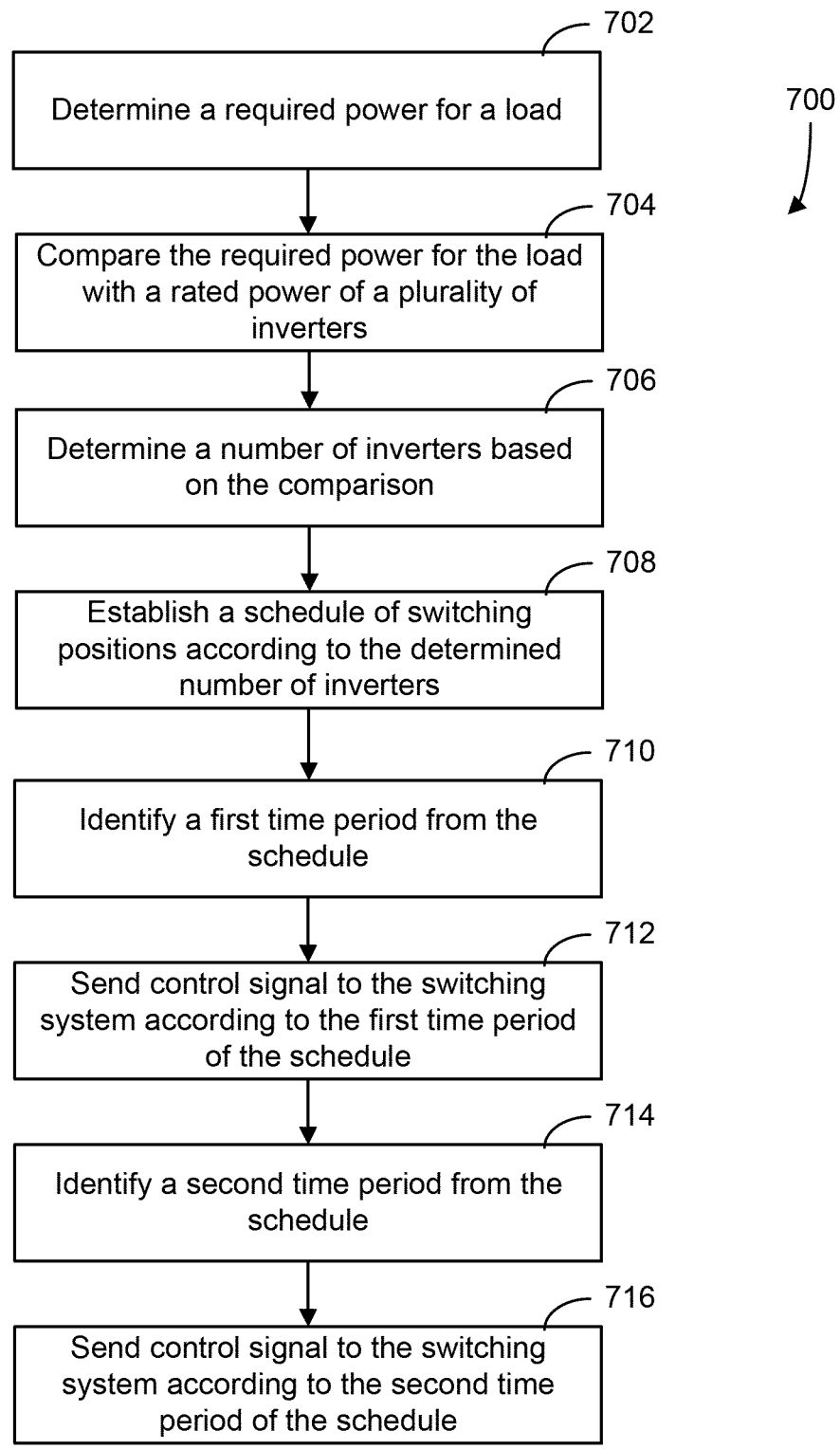
FIG. 7A illustrates a flowchart of an example method for controlling the output of energy storage units between inverters, according to some embodiments.

FIG. 7A illustrates a flowchart of an example method 700 for controlling the output of energy storage units between inverters, according to some embodiments. The method 700 can be performed by a data processing system (e.g., a controller, the RES–ESS dispatcher unit 36, the ESS controller 22, the RES SCADA controller 12, the computing device 900, the energy manager 204, etc.). In some embodiments, the data processing system is the controller of a renewable energy plant that contains energy storage units (e.g., the energy storage units 606 and/or 608) that charge a load (e.g., the load 216) through a switching system (e.g., the switching system 610) and/or one or more inverters (e.g., the inverters 612 and 614). The data processing system may control the switching system by changing a switching position of the switching system according to a schedule. The data processing system can cause different sets (or subsets) of inverters to power the load for different time periods according to the schedule. The data processing system can control the switching system to cause the different energy storage units to connect with the inverters according to the schedule. The data processing system can cycle through the different switching positions such that different inverters provide power to the load over time while the inverters that are not providing power to the load are turned off. In doing so, the data processing system can maximize the amount of power individual inverters provide to the load and/or minimize the amount of power individual energy storage units provide to the load. Thus, the inverters and the energy storage units can operate efficiently while minimizing inefficiencies of no-load losses at the inverters.

At operation 702, the data processing system determines a required power for a load. The data processing system can determine the required power for the load by monitoring the load requirements or required power of the load. The data processing system can monitor the load requirements or the required power by polling or retrieving measurements from one or more meters that measure the power requirements of the load. In some embodiments, the data processing system can poll or retrieve a value from a meter that measures the amount of energy the load is receiving from an energy grid to determine the energy requirements of the load.

At operation 704, the data processing system compares the required power for the load with a rated power of a plurality of inverters. The rated power for the plurality of inverters can be a maximum power that the inverters can provide to the load at a single point in time or the amount of power at which the inverters operate the most efficiently. The rated power can be stored in memory of the data processing system. The data processing system can retrieve the rated power from memory and compare the rated power with the required power that the data processing system determined in the operation 702.

At operation 706, the data processing system determines a number of inverters based on the comparison. The data processing system can determine the number of inverters by dividing the required power for the load by the rated power for the energy storage system to determine a first value. The data processing system can multiply the first value by the total number of inverters that are in the plurality of inverters connected with the load. The output of the multiplication can be a number of inverters to use to provide power to the load to satisfy the power requirements of the load.

At operation 708, the data processing system establishes a schedule for the determined number of inverters to provide the required power. The data processing system can establish the schedule by determining different permutations or combinations of inverters that are possible with the determined number of inverters. The determined permutations or combinations may or may not have overlapping inverters between each other. Each permutation or combination can be a set or subset of inverters. The schedule can be a file or record (e.g., a file, document, table, listing, message, notification, etc.) that includes different time periods for a switching system that selectively connects energy storage units with inverters to power the load.

The data processing system can determine switching positions that connect the energy storage units to the inverters according to the different permutations or combinations. For example, the data processing system can divide the energy units into groups, sets, or subsets of energy storage units based on the determined number of inverters that are to be used to power the load. The data processing system can do so by dividing the total number of energy storage units that are connected with the switching system by the determined number of inverters to power the load to determine a number of energy storage units per group, set, or subset. The data processing system can determine switching positions that will each cause sets of the determined number of energy storage units to each power a different inverter. The data processing system can generate data indicating the states of the switches for the individual switching positions and store the data in memory with associations with identifications of the respective switching positions of the data. The data processing system can insert the identifications into different time periods of a schedule to generate the schedule, in some cases without any repetition of the different switching positions. The data processing system may use the schedule to control or change the switching positions of the switching system according to the identifications and/or data of the schedule and the time periods of the schedule. The data processing system can repeat the switching positions of the schedule after reaching the last time period of the schedule to enable continuous control of power to the load.

At operation 710, the data processing system identifies a first time period from the schedule. The data processing system can identify the first time period as the first time period of the schedule or as a time period that includes a time stamp or a range of times that includes the current time at which the data processing system is identifying the first time period.

At operation 712, the data processing sends a control signal to the switching system that corresponds to the first time period from the schedule. The data processing system can identify or determine the control signal for the first time period by identifying the data of a first switching position for the first time period. The data processing system can identify the data of the first switching position from the schedule based on an identification of the first switching position having a stored association with the first time period. The data processing system can send or transmit control signals to the switching system to cause the switching system to have a switching position in which energy storage units provide power to a first set of the determined number of inverters to satisfy the power requirements of the load. In some cases, the control signals can cause any inverters of the first set of inverters to change from an "off" state to an "on" state. In some cases, the data processing system can send or transmit control signals to the inverters that are not connected with any energy storage units to change from the "on" state to the "off" state.

At operation 714, the data processing system identifies a second time period from the schedule. The second time period can be next on the schedule after the first time period. The data processing system can identify the second time period responsive to determining the first time period has ended.

At operation 716, the data processing sends a control signal to the switching system that corresponds to the second time period from the schedule. The data processing system can identify or determine the control signal for the second time period by identifying the data of a second switching position for the second time period. The data processing system can identify the data of the second switching position from the schedule based on an identification of the second switching position having a stored association with the second time period. The data processing system can send or transmit control signals to the switching system to cause the switching system to have a switching position in which energy storage units provide power to a second set of the determined number of inverters to satisfy the power requirements of the load. In some cases, the control signals can cause any inverters of the second set of inverters to change from an "off" state to an "on" state. In some cases, the data processing system can send or transmit control signals to the inverters that are not connected with any energy storage units to change from the "on" state to the "off" state.

Figure 7B:
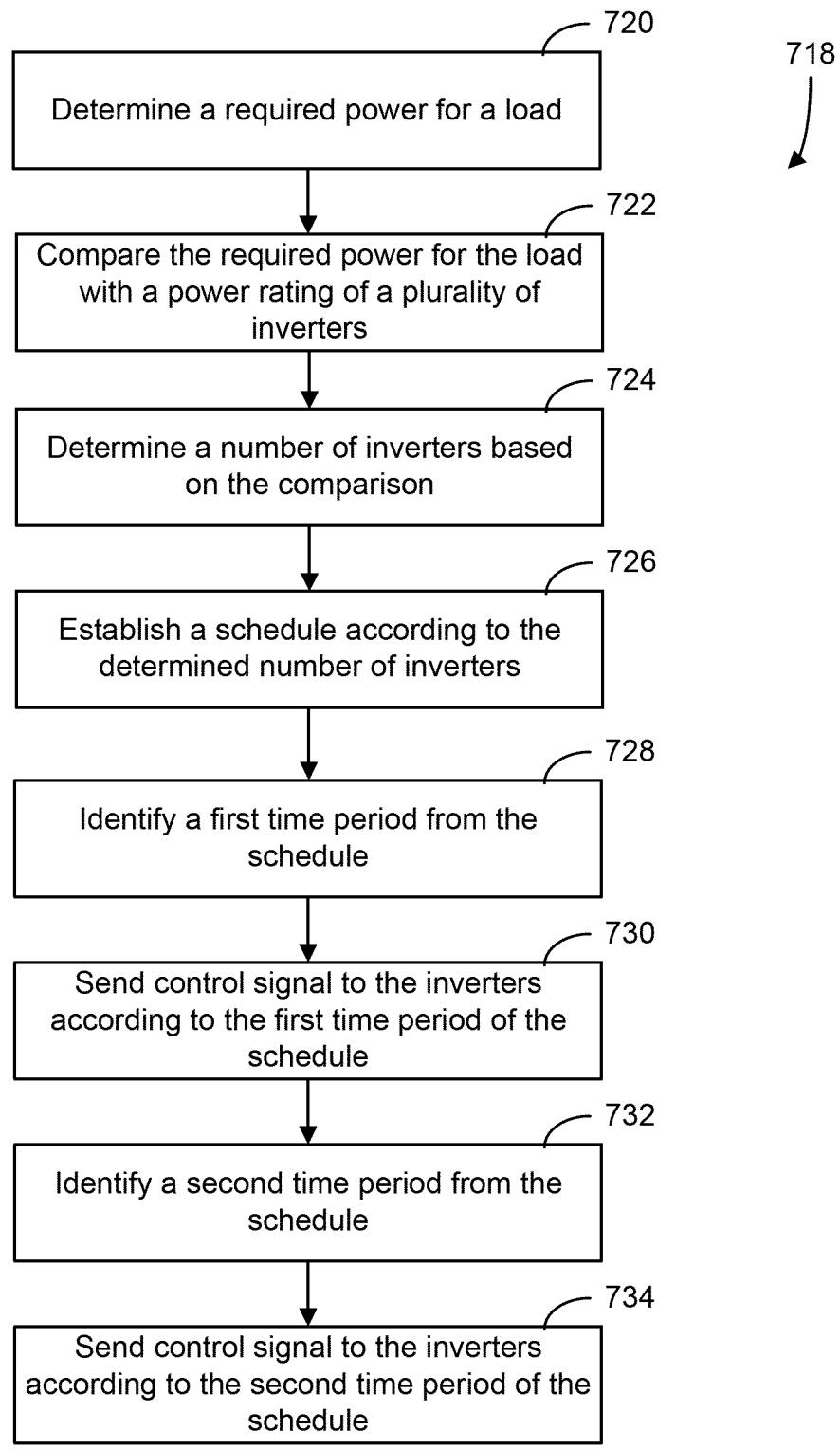
FIG. 7B illustrates a flowchart of an example method for controlling the output of energy storage units between inverters, according to some embodiments.

FIG. 7B illustrates a flowchart of an example method 718 for controlling the output of energy storage units between inverters, according to some embodiments. The method 718 can be performed by a data processing system (e.g., a controller, the RES-ESS dispatcher unit 36, the ESS controller 22, the RES SCADA controller 12, the computing device 900, the energy manager 204, etc.). In some embodiments, the data processing system is the controller of a renewable energy plant that contains energy storage units (e.g., the energy storage units 606 and/or 608) that charge a load (e.g., the load 216) through one or more inverters (e.g., the inverters 612 and 614). The data processing system may operate the different inverters by transmitting signals (e.g., control signals) to the inverters (e.g., the inverters of the renewable energy plant that are coupled or connected with energy storage units of the renewable energy plant) to cause the inverters to be in different control positions. Each control position can correspond to one or more defined inverters of the renewable energy plant drawing power or energy from defined one or more energy storage units of the renewable energy plant. The data processing system can operate the inverters in different control positions based on the amount of power that is required by the load similar to the method described with reference to FIG. 7A. The data processing system can operate the inverters by transmitting control signals to the inverters that cause the inverters to draw energy from specific energy storage units and, in some cases, not other energy storage units (e.g., such as by changing the positions of switches internal or inside a housing of the inverters that connect the inverters to the different energy storage units). The data processing system can change the control positions of the inverters over time to optimize the efficiency of the inverters (e.g., maximize the amount of energy the individual inverters receive while turning other inverters off). The data processing system can control the control positions of the inverters over time as the data processing system receives measurements regarding the power requirements of the load. In this way, the data processing system can control which energy storage unit provides power to which inverter in real-time to vary the amount of power each inverter receives for efficient operation. The method 718 may include more or fewer operations and the operations may be performed in any order.

At operation 720, the data processing system determines a required power for a load. The data processing system can determine the required power for the load by monitoring the load requirements or required power of the load. The data processing system can perform the operation 720 in the same or a similar manner to the manner described above with respect to the operation 702.

At operation 722, the data processing system compares the required power for the load with a rated power of a plurality of inverters. The rated power for the plurality of inverters can be a maximum power that the inverters can provide to the load at a single point in time or the amount of power at which the inverters operate the most efficiently. The rated power can be stored in memory of the data processing system. The data processing system can perform the operation 722 in the same or a similar manner to the manner described above with respect to the operation 704.

At operation 724, the data processing system determines a number of inverters based on the comparison. The data processing system can perform the operation 724 in the same or a similar manner to the manner described above with respect to the operation 706.

At operation 726, the data processing system establishes a schedule for the determined number of inverters to provide the required power. The data processing system can establish the schedule by determining different permutations or combinations of inverters that are possible with the determined number of inverters. The determined permutations or combinations may or may not have overlapping inverters between each other. Each permutation or combination can be a set or subset of inverters. The schedule can be a file or record (e.g., a file, document, table, listing, message, notification, etc.) that includes different time periods in which different sets of inverters draw power or energy from the energy storage units to power the load.

The data processing system can determine control positions in which individual inverters of sets of inverters draw energy from different sets or subsets of energy storage units. For example, the data processing system can divide the energy units into groups, sets, or subsets of energy storage units based on the determined number of inverters that are to be used to power the load. The data processing system can divide the total number of energy storage units that are connected with the switching system by the determined number of inverters to power the load to determine a number of energy storage units per group, set, or subset. The data processing system can determine control positions that will each cause sets of the determined number of energy storage units to each power a different inverter. The data processing system can generate data indicating the states of the switches of the individual inverters in each set and store the data in memory with associations with identifications of the respective control positions of the data. The data processing system can insert the identifications into different time periods of a schedule to generate the schedule, in some cases without any repetition of the different control positions within the schedule. The data processing system may use the schedule to control or change the control positions of the inverters according to the identifications and/or data of the schedule and the time periods of the schedule. The data processing system can repeat the control positions of the schedule after reaching the last time period of the schedule to enable continuous control of power to the load.

At operation 728, the data processing system identifies a first time period from the schedule. The data processing system can identify the first time period as the first time period of the schedule or as a time period that includes a time stamp or a range of times that includes the current time at which the data processing system is identifying the first time period.

At operation 730, the data processing sends one or more control signals to a first set of inverters that corresponds to the first time period from the schedule. The data processing system can identify or determine the control signal for the first time period by identifying the data of a first control position for the first time period. The data processing system can identify the data of the first control position from the schedule based on an identification of the first control position having a stored association with the first time period. The data processing system can send or transmit control signals to the inverters to cause the switches of the inverters to collectively have the first control position in which energy storage units provide power to the first set of inverters to satisfy the power requirements of the load. In some cases, the control signals can cause any inverters of the first set of inverters to change from an "off" state to an "on" state. In some cases, the data processing system can send or transmit control signals to the inverters that are not of the first set of inverters to change from the "on" state to the "off" state.

At operation 732, the data processing system identifies a second time period from the schedule. The second time period can be next on the schedule after the first time period.

The data processing system can identify the second time period responsive to determining the first time period has ended.

At operation 734, the data processing sends a control signal to a second set of inverters that corresponds to the second time period from the schedule. The data processing system can identify or determine the control signal for the second time period by identifying the data of a second control position for the second time period. The data processing system can identify the data of the second control position from the schedule based on an identification of the second control position having a stored association with the second time period. The data processing system can send or transmit control signals to the inverters to cause the switches of the inverters to collectively have the second control position in which energy storage units provide power to the second set of inverters to satisfy the power requirements of the load. In some cases, the control signals can cause any inverters of the second set of inverters to change from an "off" state to an "on" state. In some cases, the data processing system can send or transmit control signals to the inverters that are not of the second set of inverters to change from the "on" state to the "off" state.

Figure 8A:
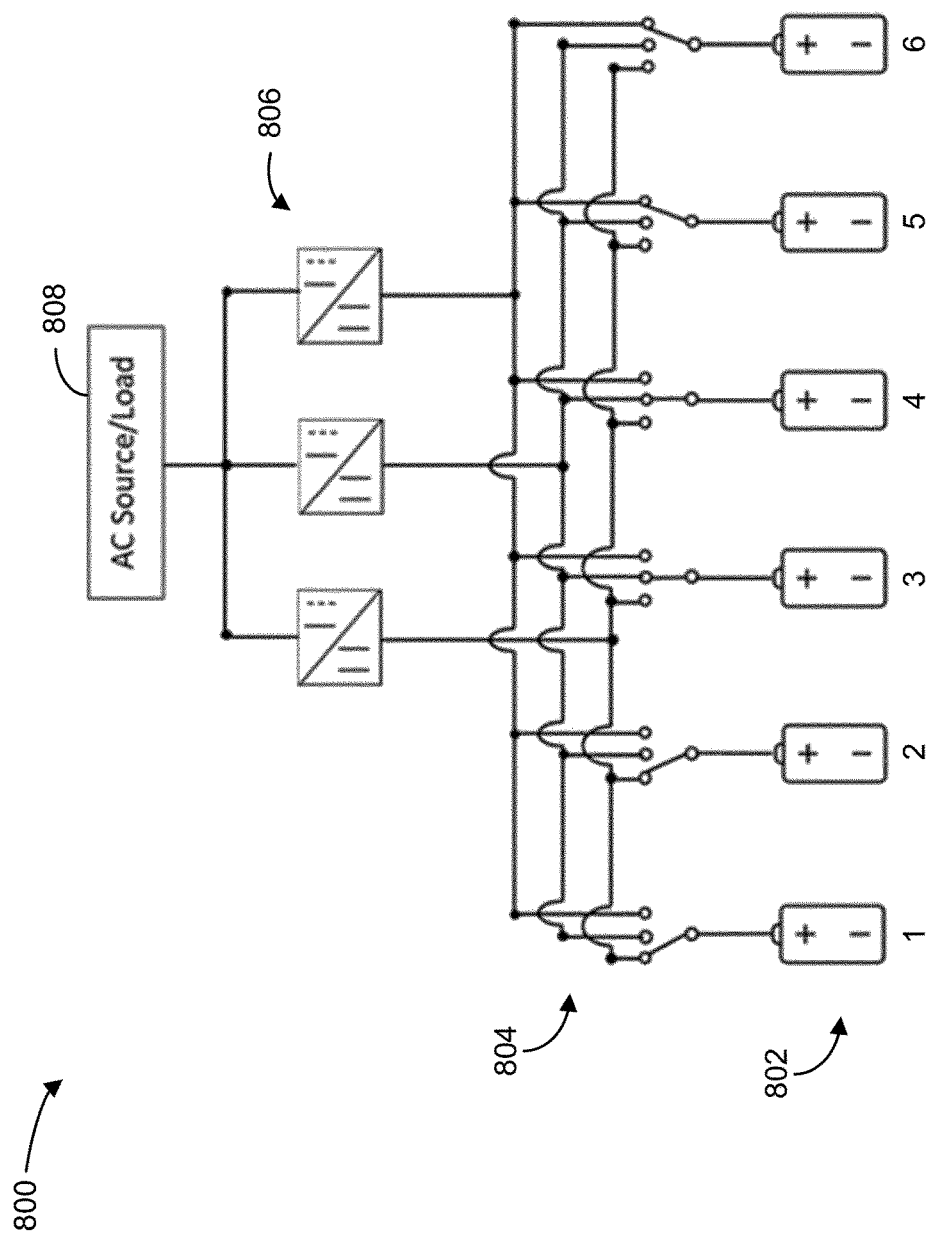
FIG. 8A illustrates a system for switching energy storage units between inverters, according to some embodiments.

FIG. 8A illustrates a block diagram of an example system 800 for switching energy storage units between inverters, according to some embodiments. The elements of the system 800 can be the same as or similar to the elements shown and described with reference to FIG. 6. The system 800 can include energy storage units 802, a switching system 804, inverters 806, and a load 808. The energy storage units 802 can be the same as or similar to the energy storage units 606 and 608. The energy storage units 802 can include any number of energy storage units. The switching system 804 can be the same as or similar to the switching system 610. The inverters 806 can be the same as or similar to the inverters 612 and/or 614. The inverters 806 can be or include battery inverters. The inverters 806 can include any number of inverters. The load 808 can be the same as or similar to the load 616. A data processing system or controller (e.g., the energy manager 604) can control the switching position of the switching system 804 to connect and/or disconnect different energy storage units from the inverters 806 to power the load 808. The data processing system can control the switching position of the switching system 804 over time according to a schedule. The data processing system can also control the "on" or "off" state of the inverters 806 such that only inverters that are receiving power (e.g., are connected with at least one energy storage unit) are on while the other inverters are off.

The data processing system can operate the switching system 804 according to a schedule. The data processing system can determine or generate the schedule according to the required power for the load. For example, if the required power is 100%, then the data processing system can set the switching position of the switching system 804 as illustrated in FIG. 8A, with two energy storage units connected to each inverter 806. Each energy storage unit 802 can deliver power at its maximum output level (its lowest efficiency) and each inverter 806 would also operate at its maximum output level (its highest efficiency). In another example, if the required power is 0%, then no power would be delivered, and the switching arrangement can be irrelevant.

In another example, for required power levels up to 33.3% (or 1/{total number of inverters 806}), all six energy storage units 802 can be switched to drive a single inverter 806. Distributing the power required across all six energy storage units 802 can minimize the power drawn from each energy storage units 802, and thus maximize the efficiency of the energy storage units 802. Concentrating all the power required into a single inverter 806 can maximize the power flow through that inverter 806, and thus maximize efficiency of the inverter 806. At a required power level of 33.3%, each energy storage unit 802 can operate at 33.3% of its rated power, while the inverter 806 operates at 100% of its rated power. In some cases, to ensure approximately equal wear and tear on the inverters 806, low-power operations can be cycled between the inverters 806.

For required power levels between 33.3% and 66.7%, three energy storage units 802 can be switched to drive a first inverter 806 and three to drive a second inverter 806. Accordingly, at a required power level of 33.3%, each energy storage unit 802 can operate at 33.3% of its rated power (e.g., as before); while each of the two inverters 806 would operate at 50% of its rated power. At a rated power level of 66.7%, each energy storage unit 802 can operate at 66.7% of its rated power (e.g., as before); while each of the two inverters 806 would operate at 100% of its rated power.

For required power levels between 66.7% and 100%, two energy storage units 802 could be switched to drive a first inverter 806, two to drive a second inverter 806, and two to drive a third inverter 806 (which is illustrated in FIG. 8A). Accordingly, at a required power level of 66.7%, each energy storage unit 802 would operate at 66.7% of its rated power (e.g., as before); and each of the three inverters 806 would operate at 66.7% of its rated power. At a rated power level of 100%, each energy storage unit 802 and each inverter 806 would operate at 100% of its rated power.

In some cases, depending on the efficiency curves of the energy storage units 802 and/or the inverters 806, an alternative method may be used. For example, the efficiency curves of the inverters 806 can be steep near the high power end of the range but flat near the low power end of the range. In this case, operations at a required power of up to 33.3% would be as described above. But, when the required power rises above 33.3%, one of the energy storage units 802 would be switched to a second inverter 806. This would cause the power flowing through the first inverter 806 to operate in a range of 83.3% to 100% of its rated power (e.g., from 100% immediately before the switching of one of the energy storage units 802), and the power flowing through the second inverter 806 would now be up to 16.7% of its rated power. The optimal distribution of power would depend on the efficiency curves of the energy storage units 802: if the first inverter 806 is held at 100% of its rated power after switching, then the five units connected to the first inverter 806 would see their power output step up from 33.3% to 40% of their rated power, while the one energy storage unit 802 connected to the second inverter 806 would have zero power output immediately after switching. Conversely, if the power output of the first inverter 806 falls to 83.3% after switching then all six energy storage units 802 would continue to deliver 33.3% of their rated output power. Thus, most of the power would continue to flow through an inverter that is operating close to its maximum efficiency, while only a small amount of power would flow through an inverter operating at relatively low efficiency.

As the required power continues to rise, the operating power levels of the two inverters 806 would be optimized at each required power point until the required power output of the total system is 40%, at which point the first inverter 806 would again be operating at 100% of its rated power, and the second inverter 806 at 20% of its rated power. At this point a second energy storage unit 802 would be switched to the second inverter 806, and this pattern would repeat as the required power output increases, until on crossing a total required power output of 50% three energy storage units 802 would be connected to the first inverter 806, and three to the second. This configuration would be the most efficient for required total power outputs in the range of 50% to 66.7%.

Above 66.7% required power output, two switching configurations are possible, and the preferred configuration will depend on the efficiency curves of the inverters 806 and the energy storage units 802. The first configuration connects energy storage units 1, 2 and 3 to a first inverter 806; units 4 and 5 to a second inverter 806; and unit 6 to the third inverter 806; the second configuration connects energy storage units 1 and 2 to a first inverter 806; energy storage units 3 and 4 to a second inverter 806; and energy storage units 5 and 6 to the third inverter 806. To give numerical examples, in the first configuration, a required power of 66.7% could be achieved by loading the three inverters 806 to 100%, 67%, and 33% of their rated powers respectively; or by loading the three inverters 806 to 100%, 100%, and 0% of their rated powers respectively; or by loading the three inverters 806 to 75%, 75%, and 50% of their rated powers respectively. Achieving these loadings would involve driving energy storage units 1-3 at 67%, 67%, or 50% of rated powers (for the three respective loadings); energy storage units 4 and 5 at 67%, 100%, or 75% of their rated powers; and energy storage units 6 at 67%, 0%, or 100% of its rated power. In the second configuration, a required power of 66.7% could be achieved by loading all three inverters 806 to 67% of their rated powers respectively; or by loading the three inverters 806 to 100%, 100% and 0% of their rated powers respectively. Achieving these loadings would involve driving energy storage units 1 and 2 at 67% or 100% of rated powers (for the two respective loadings); energy storage units 3 and 4 at 67% or 100% of rated powers; and energy storage units 5 and 6 at 67% or 0% of their rated power. Other loadings and power settings could also achieve 66.7% required power, in other examples.

From these starting points, the power loadings of the energy storage units 802 and any inverters 806 not already at 100% of their rated powers could be increased until, at 100% required power, all the energy storage units 802 and all the inverters 806 would be operating at 100% of their rated powers.

Figure 8B:
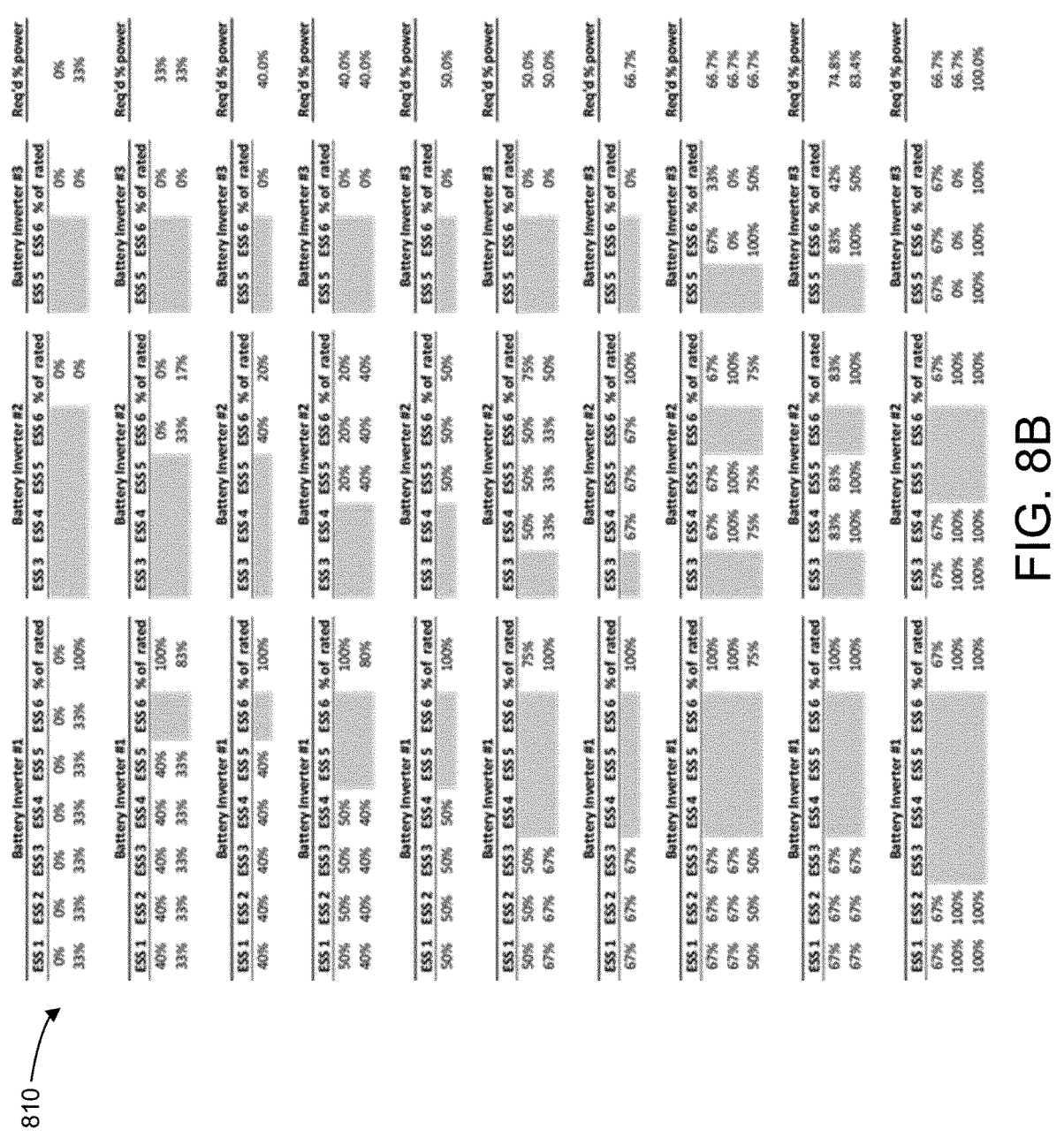

An example schedule 810 is illustrated in FIG. 8B. The schedule 810 illustrates a listing of various switching configurations, energy storage unit power settings, inverter power loadings, and corresponding required percent power, including a number of key transition points. In FIG. 8B, greyed-out cells mark energy storage unit/inverter combinations that are isolated by the switching system 804 (e.g., not connected to each other). In some instances, to equalize the wear and tear on the inverters 806, the roles of the individual inverters 806 can be cycled from time to time.

In some cases, it can be beneficial for the inverters of a system, such as those in the system 600 or 800, to have different capacities. For example, it can be beneficial to replace an inverter (e.g., the inverter 612 or 614) with a set of, for example, four smaller inverters with capacity equal to 50%, 20%, 20% and 10% of the capacity of the other inverters. As applied to the system 800 of FIG. 8A, which is shown to have a six energy storage units by three inverters configuration, if each of these inverters has a power capacity (at maximum efficiency) of Q MW, the design can be changed or improved by replacing the one inverter with a set of four smaller inverters. The four smaller inverters can have capacities of Q/2 MW, $\frac{2}{3} \times Q$ MW, $\frac{2}{3} \times Q$ MW and Q/10 MW. The switching system 804 could also change to a 10×6 switch to enable the new inverters to separately connect with the energy storage units 802. A controller can operate the switching system 804 according to the following algorithm:

If the total required power output is less than 3.3%, all the power can be delivered to the smallest (Q/10 MW) inverter.

Between 3.3% and 6.7%, all the power could be delivered to one of the $\frac{2}{3} \times Q$ inverters, or split between the Q/10 inverter and one of the $\frac{2}{3} \times Q$ inverters.

Between 6.7% and 10%, the power could be split between a Q/10 inverter and one $\frac{2}{3} \times Q$ inverter.

Between 10% and 13.3%, the power could be split between the two $\frac{2}{3} \times Q$ inverters.

Between 13.3% and 16.7%, the two $\frac{2}{3} \times Q$ inverters could be fully powered, and the residual power sent to the Q/10 inverter.

Between 16.7% and 20%, the Q/2 inverter could be fully powered, and the residual power could be sent to the Q/10 inverter.

Between 20% and 23.3%, the Q/2 inverter and Q/10 inverter could be fully powered, and residual power could be sent to a $\frac{2}{3} \times Q$ inverter. Or, the Q/2 inverter could be fully powered, and all the residual power could be sent to a $\frac{2}{3}$ Q inverter.

Between 23.3% and 26.7%, the Q/2 inverter and a $\frac{2}{3} \times Q$ inverter could be fully powered, and residual power sent to the Q/10 inverter.

Between 26.7% and 30%, the Q/2 inverter and one $\frac{2}{3} \times Q$ inverter could be fully powered, and the residual power sent either to the other $\frac{2}{3} \times Q$ inverter or split between that inverter and the (fully powered) Q/10 inverter.

Between 30% and 33.3%, the Q/2 inverter and both $\frac{2}{3} \times Q$ inverters could be fully powered, and the residual power sent to the Q/10 inverters.

For any power above 33.3%, a combination of the other inverters could deliver power in increments of 33.3%, and the residual power could be addressed in increments of 3.3% as above.

The above algorithm can be changed or adapted for any sized increments (e.g., such as 0.1% increments).

In one aspect, a method of optimizing loading of battery inverters is disclosed. The method can include determining, by a processor, a required power for a load, the load coupled to a plurality of inverters, the plurality of inverters coupled to a plurality of energy storage units in an energy storage system (ESS); comparing, by the processor, the required power for the load with a rated power for the ESS and determining a number of a plurality of energy storage unit groups needed to provide the required power, each of the energy storage unit groups comprising one or more of the plurality of energy storage units and one or more of the plurality of inverters coupled to the one or more energy storage units of the energy storage unit group; establishing, by the processor, a schedule for the determined number of the plurality of energy storage unit groups to provide the required power, wherein the schedule includes a plurality of time periods for power delivery by the determined number of the plurality of energy storage unit groups; and sending, by the processor, a first control signal to engage a first set of energy storage unit groups for a first time period of the plurality of time periods and a second control signal to engage a second set of energy storage unit groups for a second time period of the plurality of time periods, the first energy storage unit group and the second energy storage unit group. In some embodiments, the schedule includes a sequence of periods each corresponding to a different set of energy storage unit groups, and the method comprising sending, by the processor, the second control signal to engage the second set of energy storage unit groups for the second time period in response to determining an end of the first time period and a beginning of the second time period.

In some embodiments, determining the number of the plurality of energy storage unit groups comprises dividing, by the processor, the required power for the load by the rated power of the ESS to determine a first value; and multiplying, by the processor, the first value by a total number of the plurality of energy storage unit groups. In some embodiments, sending the first control signal comprises causing, by the processor, the first set of energy storage unit groups to engage while each other energy storage unit group of the plurality of energy storage unit groups disengages for the first time period; and sending the second control signal comprises causing, by the processor, the second set of energy storage unit groups to engage while each other energy storage unit group of the plurality of energy storage unit groups disengages for the second time period. In some embodiments, causing the first energy storage unit group to engage comprises causing, by the processor, each energy storage unit of the first set of energy storage unit groups to output energy to one or more first inverters of the first set of energy storage unit groups coupled to the load; and causing the second energy storage unit group to engage comprises causing, by the processor, each energy storage unit of the second set of energy storage unit groups to output energy to one or more second inverters of the second energy storage unit group coupled to the load.

In some embodiments, the method includes sending, by the processor, first one or more control signals to operate at 0% of rated power to energy storage unit groups not in the first set of energy storage unit groups for the first time period, and second one or more control signals to operate at 100% of rated power to energy storage unit groups in the first set of energy storage unit groups for the first time period. In some embodiments, the method includes sending, by the processor, first one or more control signals to operate at 0% of rated power to energy storage unit groups not in the first set of energy storage unit groups for the first time period, and second one or more control signals to operate at 100% of a defined maximum efficiency power level to energy storage in the first set of energy storage unit groups for the first time period, the defined maximum efficiency power a portion of a rated power of the inverters in the first set of energy storage unit groups.

In some embodiments, the method includes determining, by the processor, the required power of the load is lower than a maximum operating power or a maximum efficiency power level of the first set of energy storage unit groups for the first time period, wherein sending the first control signal to the first energy storage unit group comprises, responsive to the determining the required power of the load is lower than the maximum operating power or the maximum efficiency power level of the first energy storage unit group, sending, by the processor, the first control signal to cause each of first set of energy storage unit groups to provide an equal amount of power to the load, the equal amount of power lower than a maximum operating power or the maximum efficiency power level of each energy storage unit group of the first set of energy storage unit groups can provide.

In some embodiments, the method includes determining, by the processor, the required power of the load is lower than a maximum operating power or a maximum efficiency power level of the first set of energy storage unit groups for the first time period, wherein sending the first control signal to the first set of energy storage unit groups comprises, responsive to the determining the required power of the load is lower than the maximum operating power or the maximum efficiency power level of the first grouping, sending, by the processor, the first control signal to cause (i) a first one or more of the first set of energy storage unit groups to provide a maximum efficiency power level or a maximum operating power that the respective first one or more energy storage unit groups can provide, and (ii) each other energy storage unit group of the first set of energy storage unit groups to provide an amount lower than the maximum efficiency power level or the maximum operating power that the respective other energy storage unit groups can provide.

In one aspect, the present disclosure describes an energy storage control system. The system can include a plurality of energy storage units configured to output power to a load, the plurality of energy storage units in an energy storage system (ESS); a plurality of inverters coupled to the plurality of energy storage units; and a controller coupled to the plurality of inverters and configured to determine a required power for the load; compare the required power for the load with a rated power for the ESS and determine a number of a plurality of energy storage unit groups needed to provide the required power, each of the energy storage unit groups comprising one or more of the plurality of energy storage units and one or more of the plurality of inverters coupled to the one or more energy storage units of the energy storage unit group; establish a schedule for the determined number of the plurality of energy storage unit groups to provide the required power, wherein the schedule includes a plurality of time periods for power delivery by the determined number of the plurality of energy storage unit groups; and send a first control signal to engage a first set of energy storage unit groups for a first time period of the plurality of time periods and a second control signal to engage a second set of energy storage unit groups for a second time period of the plurality of time periods, the first energy storage unit group and the second energy storage unit group.

In some embodiments, the schedule includes a sequence of periods each corresponding to a different energy storage unit group, and the controller is configured to send the second control signal to engage the second set of energy storage unit groups for the second time period in response to determining an end of the first time period and a beginning of the second time period. In some embodiments, the controller is configured to determine the number of the plurality of energy storage unit groups by dividing the required power for the load by the rated power of the ESS to determine a first value; and multiplying the first value by a total number of the plurality of energy storage unit groups.

In some embodiments, the controller is configured to send the first control signal by causing the first set of energy storage unit groups to engage while each other energy storage unit group of the plurality of energy storage unit groups disengages for the first time period; and wherein the controller is configured to send the second control signal by causing the second set of energy storage unit groups to engage while each other energy storage unit group of the plurality of energy storage unit groups disengages for the second time period. In some embodiments, the controller is configured to cause the first energy storage unit group to engage by causing each energy storage unit of the first set of energy storage unit groups to output energy to one or more first inverters of the first set of energy storage unit groups coupled to the load; and wherein the controller is configured to cause the second energy storage unit group to engage by causing each energy storage unit of the second set of energy storage unit groups to output energy to one or more second inverters of the second energy storage unit group coupled to the load.

In some embodiments, the controller is configured to send first one or more control signals to operate at 0% of rated power to energy storage unit groups not in the first set of energy storage unit groups for the first time period, and second one or more control signals to operate at 100% of rated power to energy storage unit groups in the first set of energy storage unit groups for the first time period. In some embodiments, the controller is configured to send first one or more control signals to operate at 0% of rated power to energy storage unit groups not in the first set of energy storage unit groups for the first time period, and second one or more control signals to operate at 100% of a defined maximum efficiency power level to energy storage in the first set of energy storage unit groups for the first time period, the defined maximum efficiency power a portion of a rated power of the inverters in the first set of energy storage unit groups.

In some embodiments, the controller is configured to determine the required power of the load is lower than a maximum operating power or a maximum efficiency power level of the first set of energy storage unit groups for the first time period, wherein the controller is configured to send the first control signal to the first energy storage unit group by, responsive to the determining the required power of the load is lower than the maximum operating power or the maximum efficiency power level of the first energy storage unit group, sending the first control signal to cause each of first set of energy storage unit groups to provide an equal amount of power to the load, the equal amount of power lower than a maximum operating power or the maximum efficiency power level of each energy storage unit group of the first set of energy storage unit groups can provide.

In one aspect, a non-transitory computer-readable medium comprising computer-executable instructions with executable instructions can be embodied thereon is disclosed. When executed by a processor, the executable instructions can cause the processor to perform a process including determining a required power for a load, the load coupled to a plurality of inverters, the plurality of inverters coupled to a plurality of energy storage units in an energy storage system (ESS); comparing the required power for the load with a rated power for the ESS and determining a number of a plurality of energy storage unit groups needed to provide the required power, each of the energy storage unit groups comprising one or more of the plurality of energy storage units and one or more of the plurality of inverters coupled to the one or more energy storage units of the energy storage unit group; establishing a schedule for the determined number of the plurality of energy storage unit groups to provide the required power, wherein the schedule includes a plurality of time periods for power delivery by the determined number of the plurality of energy storage unit groups; and sending a first control signal to engage a first set of energy storage unit groups for a first time period of the plurality of time periods and a second control signal to engage a second set of energy storage unit groups for a second time period of the plurality of time periods, the first energy storage unit group and the second energy storage unit group.

In some embodiments, the schedule includes a sequence of periods each corresponding to a different set of the plurality of energy storage unit groups, and the process comprising sending the second control signal to engage the second set of energy storage unit groups for the second time period in response to determining an end of the first time period and a beginning of the second time period. In some embodiments, determining the number of the plurality of energy storage unit groups comprises dividing the required power for the load by the rated power of the ESS to determine a first value; and multiplying the first value by a total number of the plurality of energy storage unit groups.

In one aspect, the present disclosure describes an energy storage control system. The energy storage control system can include a plurality of inverters configured to output power to a load; a switching system connected to the plurality of inverters, the switching system comprising one or more switches; a plurality of energy storage units selectively coupled to the plurality of energy storage units by the switching system; and a controller configured to determine a required power for the load; compare the required power for the load with a power rating of the plurality of inverters and determine a number of the plurality of inverters to provide the required power; determine a switching position for the switching system based on the determined number of the plurality of inverters, the switching position corresponding to power delivery by a set of the plurality of inverters, the set having the determined number of inverters; and send a control signal to the switching system to connect one or more of the plurality of energy storage units with the set of the plurality of inverters.

In some embodiments, the control signal is a first control signal, the set of inverters is a first set of inverters, and the one or more of the plurality of inverters is a first one or more of the plurality of inverters; wherein the controller is configured to establish a schedule of switching positions according to the determined number of the plurality of inverters, the schedule including a plurality of time periods for power delivery by different sets of the plurality of inverters, including the first set of inverters, for different time periods of the plurality of time periods; and send the first control signal to the switching system to connect the first one or more of the plurality of energy storage units with the first set of the plurality of inverters for a first time period of the plurality of time periods and a second control signal to the switching system to connect second one or more of the plurality of energy storage units with a second set of the plurality of inverters for a second time period of the plurality of time periods.

In some embodiments, the schedule includes a sequence of time periods each corresponding to a different set of the plurality of inverters, and wherein the controller is configured to send the second control signal to the switching system to connect the second one or more of the plurality of energy storage units with the second set of inverters for the second time period responsive to determining an end of the first time period and a beginning of the second time period.

In some embodiments, the controller is configured to send the first control signal by causing, via the first control signal, the switching system to connect the first one or more of the plurality of energy storage units to a first set of two or more inverters of the plurality of inverters; and wherein the controller is configured to send the second control signal by causing, via the second control signal, the switching system to connect the second one or more energy storage units of the plurality of energy storage units to a second set of two or more inverters of the plurality of inverters, the second set different from the first set.

In some embodiments, the controller is further configured to detect a change in the required power of the load; and adjust the schedule of switching positions based on the detected change in required power of the load.

In some embodiments, the controller is further configured to responsive to detecting the change in required power of the load, identify a new required power for the load; and determine a second number of the plurality of inverters to provide the new required power for the load based on the power rating of the plurality of inverters, wherein the controller is configured to adjust the schedule of switching positions by adjusting the schedule based on the second number of the plurality of inverters to provide the new required power for the load.

The energy storage control system of claim 1, wherein the controller is further configured to detect a change in the required power of the load; responsive to detecting the change in required power of the load, identify a new required power for the load; and determine a second number of the plurality of inverters to provide the new required power for the load based on the power rating of the plurality of inverters, wherein the controller is configured to adjust the switching position of the switching system based on the second number of the plurality of inverters to provide the new required power for the load.

In some embodiments, the controller is configured to divide the required power for the load by the power rating of the plurality of inverters to determine a first value; and multiply the first value by a total number of the plurality of inverters to determine the number of the plurality of inverters. In some embodiments, the controller is further configured to transmit a control signal to activate an inverter of the plurality of inverters responsive to determining a switching position of the switching system connects an energy storage unit to the inverter. In some embodiments, the power rating of the plurality of inverters comprises a power capacity at which one or more of the plurality of inverters reaches a maximum efficiency.

In some embodiments, the power rating of the plurality of inverters comprises a maximum power capacity of the plurality of inverters. In some embodiments, the first one or more of the plurality of energy storage units includes the same or different energy storage units from the second one or more of the plurality of energy storage units.

In one aspect, the present disclosure describes a method of optimized loading of battery inverters. The method can include determining, by a processor, a required power for a load; comparing, by the processor, the required power for the load with a power rating of a plurality of inverters coupled to the load and determining, by the processor, a number of the plurality of inverters to provide the required power; determining, by the processor, a switching position for a switching system coupled between the plurality of inverters and a plurality of energy storage units based on the determined number of the plurality of inverters, the switching position corresponding to power delivery by a set of the plurality of inverters, the set having the determined number of inverters; and sending, by the processor, a control signal to the switching system to connect one or more of the plurality of energy storage units with the set of the plurality of inverters.

In some embodiments, the control signal is a first control signal, the set of inverters is a first set of inverters, and the one or more of the plurality of inverters is a first one or more of the plurality of inverters, the method comprising establishing, by the processor, a schedule of switching positions according to the determined number of the plurality of inverters, the schedule including a plurality of time periods for power delivery by different sets of the plurality of inverters, including the first set of inverters, for different time periods of the plurality of time periods; and sending, by the processor, the first control signal to the switching system to connect first one or more of the plurality of energy storage units with the first set of the plurality of inverters for a first time period of the plurality of time periods and a second control signal to the switching system to connect second one or more of the plurality of energy storage units with a second set of the plurality of inverters for a second time period of the plurality of time periods.

In some embodiments, the schedule includes a sequence of time periods each corresponding to a different set of the plurality of inverters, and the method comprises sending, by the processor, the second control signal to the switching system to connect the second one or more of the plurality of energy storage units with the second set of inverters for the second time period responsive to determining an end of the first time period and a beginning of the second time period.

In some embodiments, sending the first control signal comprises causing, by the processor via the first control signal, the switching system to connect the first one or more of the plurality of energy storage units to a first set of two or more inverters of the plurality of inverters; and wherein sending the second control signal comprises causing, by the processor via the second control signal, the switching system to connect the second one or more energy storage units of the plurality of energy storage units to a second set of two or more inverters of the plurality of inverters, the second set different from the first set. In some embodiments, the method includes detecting, by the processor, a change in the required power of the load; and adjusting, by the processor, the schedule of switching positions based on the detected change in required power of the load.

In some embodiments, the method includes responsive to detecting the change in required power of the load, identifying, by the processor, a new required power for the load; and determining, by the processor, a second number of the plurality of inverters to provide the new required power for the load based on the power rating of the plurality of inverters, wherein adjusting the schedule of switching positions comprises adjusting, by the processor, the schedule based on the second number of the plurality of inverters to provide the new required power for the load.

In one aspect, the present disclosure is directed to a non-transitory computer-readable medium comprising computer-executable instructions embodied thereon that, when executed by a processor, cause the processor to perform a method comprising determining, by a processor, a required power for a load; comparing, by the processor, the required power for the load with a power rating of a plurality of inverters coupled to the load and determining, by the processor, a number of the plurality of inverters to provide the required power; determining, by the processor, a switching position for the switching system coupled between the plurality of inverters and a plurality of energy storage units based on the determined number of the plurality of inverters, the switching position corresponding to power delivery by a set of the plurality of inverters, the set having the determined number of inverters; and sending, by the processor, a control signal to the switching system to connect one or more of the plurality of energy storage units with the set of the plurality of inverters.

In some embodiments, the control signal is a first control signal, the set of inverters is a first set of inverters, and the one or more of the plurality of inverters is a first one or more of the plurality of inverters, the method comprising establishing a schedule of switching positions according to the determined number of the plurality of inverters, the schedule including a plurality of time periods for power delivery by different sets of the plurality of inverters, including the first set of inverters, for different time periods of the plurality of time periods; and sending the first control signal to the switching system to connect first one or more of the plurality of energy storage units with the first set of the plurality of inverters for a first time period of the plurality of time periods and a second control signal to the switching system to connect second one or more of the plurality of energy storage units with a second set of the plurality of inverters for a second time period of the plurality of time periods.

In one aspect, the present disclosure is directed to an energy storage control system. The energy storage control system can include a plurality of inverters configured to output power to a load; a plurality of energy storage units coupled to the plurality of energy storage units; and a controller configured to determine a required power for the load; compare the required power for the load with a power rating of the plurality of inverters and determine a number of the plurality of inverters to provide the required power; determine a control position based on the determined number of the plurality of inverters, the control position corresponding to power delivery by a set of the plurality of inverters, the set having the determined number of inverters; and send a control signal to the set of inverters to cause the set of inverters to draw power from one or more of the plurality of energy storage units according to the control position.

In some embodiments, the control signal is a first control signal, the set of inverters is a first set of inverters, and the one or more of the plurality of inverters is a first one or more of the plurality of inverters; wherein the controller is configured to establish a schedule of control positions according to the determined number of the plurality of inverters, the schedule including a plurality of time periods for power delivery by different sets of the plurality of inverters, including the first set of inverters, for different time periods of the plurality of time periods; and send the first control signal to the first set of inverters to cause the first set of inverters to draw power from the first one or more of the plurality of energy storage units for a first time period of the plurality of time periods and a second control signal to the second set of inverters to cause the second set of inverters to draw power from the second one or more of the plurality of energy storage units for a second time period of the plurality of time periods.

In some embodiments, the schedule includes a sequence of time periods each corresponding to a different set of the plurality of inverters, and wherein the controller is configured to send the second control signal to the second set of inverters to cause the second set of inverters to draw power from the second one or more of the plurality of energy storage units for the second time period responsive to determining an end of the first time period and a beginning of the second time period.

In some embodiments, the controller is configured to send the first control signal by causing, via the first control signal, a first set of two or more inverters of the plurality of inverters to draw power from the first one or more of the plurality of energy storage units; and wherein the controller is configured to send the second control signal by causing, via the second control signal, a second set of two or more inverters of the plurality of inverters to draw power from the second one or more of the plurality of energy storage units. In some embodiments, the controller is further configured to detect a change in the required power of the load; and adjust the schedule of control positions based on the detected change in required power of the load.

In some embodiments, the controller is further configured to responsive to detecting the change in required power of the load, identify a new required power for the load; and determine a second number of the plurality of inverters to provide the new required power for the load based on the power rating of the plurality of inverters, wherein the controller is configured to adjust the schedule of control positions by adjusting the schedule based on the second number of the plurality of inverters to provide the new required power for the load.

In some embodiments, the controller is further configured to detect a change in the required power of the load; responsive to detecting the change in required power of the load, identify a new required power for the load; determine a second number of the plurality of inverters to provide the new required power for the load based on the power rating of the plurality of inverters; and adjust the control position of the plurality of inverters based on the second number of the plurality of inverters to provide the new required power for the load.

In some embodiments, the controller is configured to divide the required power for the load by the power rating of the plurality of inverters to determine a first value; and multiply the first value by a total number of the plurality of inverters to determine the number of the plurality of inverters. In some embodiments, the controller is further configured to transmit a control signal to activate an inverter of the plurality of inverters responsive to determining the control position includes the inverter drawing power from an energy storage unit. In some embodiments, the controller is configured to divide a total number of the plurality of energy storage units by the determined number of the plurality of inverters by to obtain a first value to determine a size of a subset of energy storage units to connect with each of the determined number of inverters.

Computing Environment

Having discussed specific embodiments of the present solution, it may be helpful to describe aspects of the operating environment as well as associated system components (e.g., hardware elements) in connection with the methods and systems described herein.

Figure 9A:
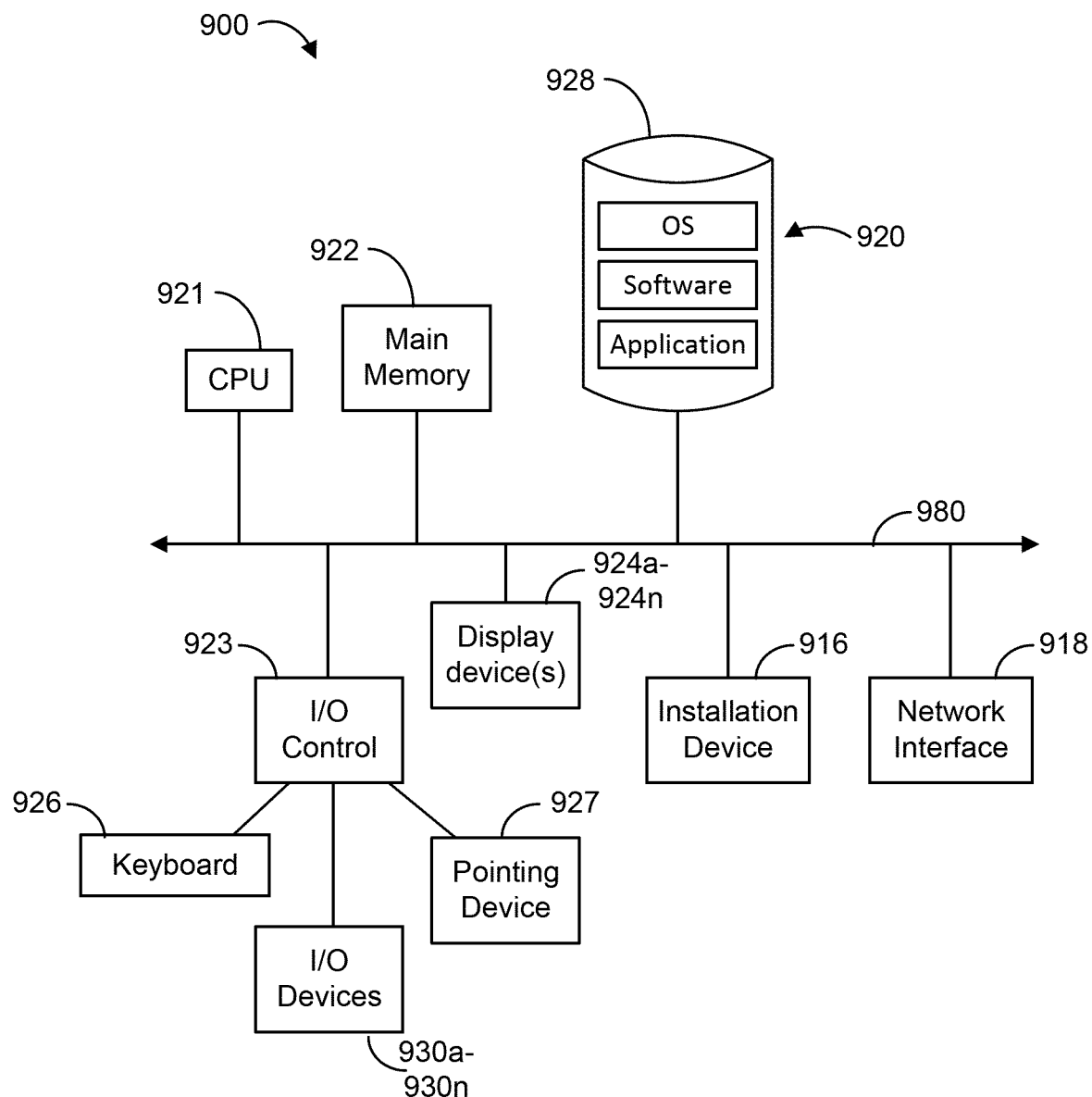
FIGS. 9A and 9B are block diagrams depicting embodiments of computing devices useful in connection with the methods and systems described herein.
Figure 9B:
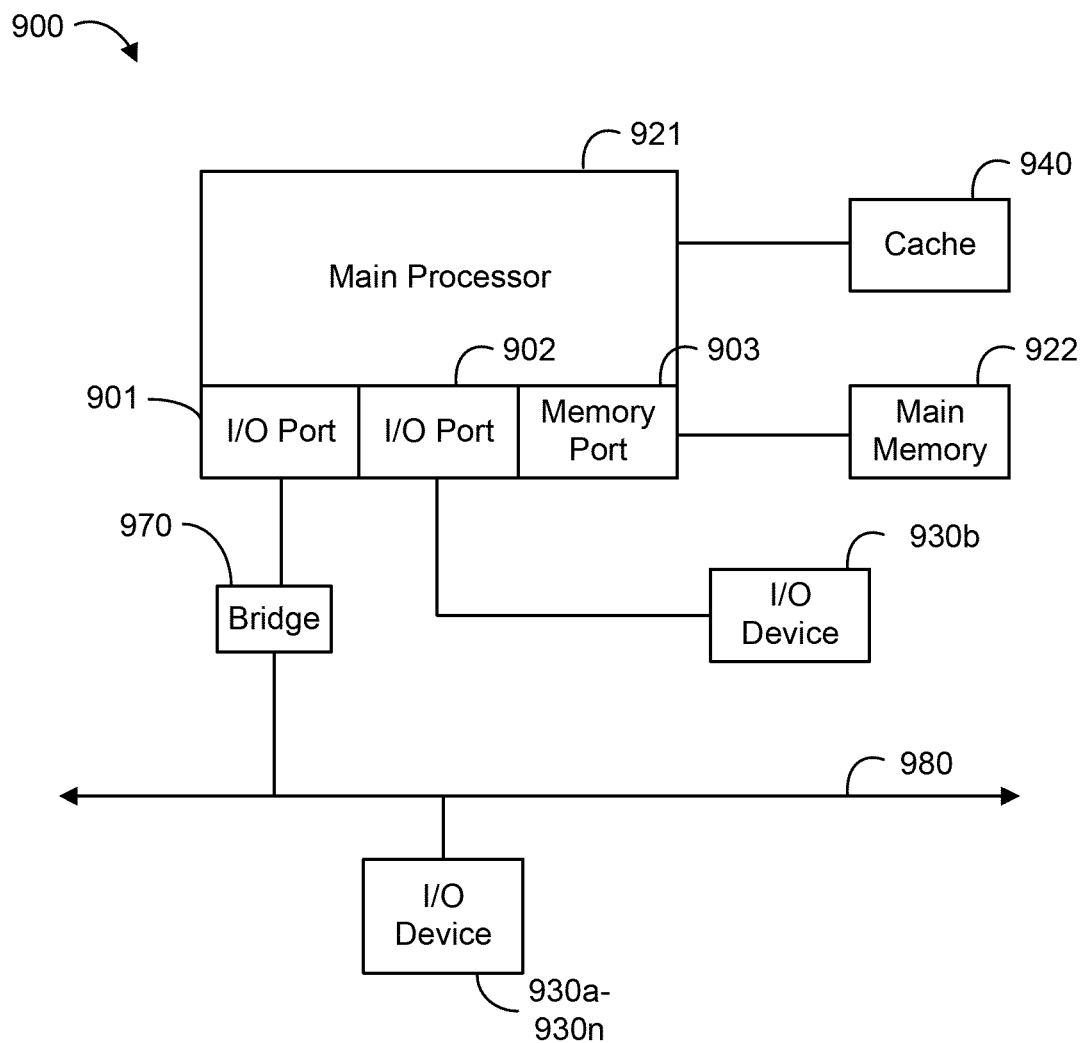

The systems discussed herein may be deployed as and/or executed on any type and form of computing device, such as a computer, network device or appliance capable of communicating on any type and form of network and performing the operations described herein. FIGS. 9A and 9B depict block diagrams of a computing device 900 useful for practicing an embodiment of the systems and methods described herein. As shown in FIGS. 9A and 9B, each computing device 900 includes a central processing unit 921, and a main memory unit 922. As shown in FIG. 9A, a computing device 900 may include a storage device 928, an installation device 916, a network interface 918, an I/O controller 923, display devices 924a-924n, a keyboard 926 and a pointing device 927, such as a mouse. The storage device 928 may include, without limitation, an operating system and/or software. As shown in FIG. 9B, each computing device 900 may also include additional optional elements, such as a memory port 903, a bridge 970, one or more input/output devices 930a-930n (generally referred to using reference numeral 930), and a cache memory 940 in communication with the central processing unit 921.

The central processing unit 921 is any logic circuitry that responds to and processes instructions fetched from the main memory unit 922. In many embodiments, the central processing unit 921 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 900 may be based on any of these processors, or any other processor capable of operating as described herein.

The main memory unit 922 may be one or more memory chips capable of storing data and allowing any storage location to be directly accessed by the central processing unit 921, such as any type or variant of Static random-access memory (SRAM), Dynamic random-access memory (DRAM), Ferroelectric RAM (FRAM), NAND Flash, NOR Flash and Solid-State Drives (SSD). The main memory unit 922 may be based on any of the above-described memory chips, or any other available memory chips capable of operating as described herein. In the embodiment shown in FIG. 9A, the central processing unit 921 communicates with main memory unit 922 via a system bus 980 (described in more detail below). FIG. 9B depicts an embodiment of a computing device 900 in which the processor communicates directly with the main memory unit 922 via a memory port 903. For example, in FIG. 9B the main memory unit 922 may be DRDRAM.

FIG. 9B depicts an embodiment in which the central processing unit 921 communicates directly with cache memory 940 via a secondary bus, sometimes referred to as a backside bus. In other embodiments, the central processing unit 921 communicates with cache memory 940 using the system bus 980. Cache memory 940 typically has a faster response time than main memory unit 922 and is provided by, for example, SRAM, BSRAM, or EDRAM. In the embodiment shown in FIG. 9B, the central processing unit 921 communicates with various I/O devices 930 via a local system bus 980. Various buses may be used to connect the central processing unit 921 to any of the I/O devices 930, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 924, the central processing unit 921 may use an Advanced Graphics Port (AGP) to communicate with the display 924. FIG. 9B depicts an embodiment of a computer 900 in which the central processing unit 921 may communicate directly with I/O device 930b, for example via HYPERTRANSPORT, RAPIDIO, or INFINIBAND communications technology. FIG. 9B also depicts an embodiment in which local busses and direct communication are mixed: the central processing unit 921 communicates with I/O device 930a using a local interconnect bus while communicating with I/O device 930b directly.

A wide variety of I/O devices 930a-930n may be present in the computing device 900. Input devices include keyboards, mice, trackpads, trackballs, microphones, dials, touch pads, touch screens, and drawing tablets. Output devices include video displays, speakers, inkjet printers, laser printers, projectors, and dye-sublimation printers. The I/O devices may be controlled by an I/O controller 923 as shown in FIG. 9A. The I/O controller may control one or more I/O devices such as a keyboard 926 and a pointing device 927, e.g., a mouse or optical pen. Furthermore, an I/O device may also provide storage and/or an installation device 916 for the computing device 900. In still other embodiments, the computing device 900 may provide USB connections (not shown) to receive handheld USB storage devices such as the USB Flash Drive line of devices manufactured by Twintech Industry, Inc., of Los Alamitos, Calif.

Referring again to FIG. 9A, the computing device 900 may support any suitable installation device 916, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 900 may further include a storage device, such as one or more hard disk drives or redundant arrays of independent disks, for storing an operating system and other related software, and for storing application software programs such as any program or software 920 for implementing (e.g., configured and/or designed for) the systems and methods described herein. Optionally, any of the installation devices 916 could also be used as the storage device. Additionally, the operating system and the software can be run from a bootable medium.

Furthermore, the computing device 900 may include a network interface 918 to interface to the network 203 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 902.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 900 communicates with other computing devices 900' via any type and/or form of gateway or tunneling protocol such as Secure Socket Layer (SSL) or Transport Layer Security (TLS). The network interface 918 may include a built-in network adapter, network interface card, PCMCIA network card, card bus network adapter, wireless network adapter, USB network adapter, modem or any other device suitable for interfacing the computing device 900 to any type of network capable of communication and performing the operations described herein.

In some implementations, the computing device 900 may include or be connected to one or more display devices 924a-924n. As such, any of the I/O devices 930a-930n and/or the I/O controller 923 may include any type and/or form of suitable hardware, software, or combination of hardware and software to support, enable or provide for the connection and use of the display device(s) 924a-924n by the computing device 900. For example, the computing device 900 may include any type and/or form of video adapter, video card, driver, and/or library to interface, communicate, connect or otherwise use the display device(s) 924a-924n. In one embodiment, a video adapter may include multiple connectors to interface to the display device(s) 924a-924n. In other embodiments, the computing device 900 may include multiple video adapters, with each video adapter connected to the display device(s) 924a-924n. In some implementations, any portion of the operating system of the computing device 900 may be configured for using multiple displays 924a-924n. One ordinarily skilled in the art will recognize and appreciate the various ways and embodiments that a computing device 900 may be configured to have one or more display devices 924a-924n.

In further embodiments, an I/O device 930 may be a bridge between the system bus 980 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 900 of the sort depicted in FIGS. 9A and 9B may operate under the control of an operating system, which control scheduling of tasks and access to system resources. The computing device 900 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 11, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 900 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 900 has sufficient processor power and memory capacity to perform the operations described herein.

In some implementations, the computing device 900 may have different processors, operating systems, and input devices consistent with the device. For example, in one embodiment, the computing device 900 is a smart phone, mobile device, tablet or personal digital assistant. In still other embodiments, the computing device 900 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 900 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

While operations are depicted in the drawings in a particular order, such operations are not required to be performed in the particular order shown or in sequential order, and all illustrated operations are not required to be performed. Actions described herein can be performed in a different order.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of" 'A' and 'B" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

What is claimed is:

1. An energy storage control system comprising:
a plurality of inverters configured to output power to a load;
a switching system connected to the plurality of inverters, the switching system comprising one or more switches;
a plurality of energy storage units selectively coupled to the plurality of energy storage units by the switching system; and
a controller configured to:
determine a required power for the load;
compare the required power for the load with a power rating of the plurality of inverters and determine a number of the plurality of inverters to provide the required power;
determine a switching position for the switching system based on the determined number of the plurality of inverters, the switching position corresponding to power delivery by a set of the plurality of inverters, the set having the determined number of inverters; and
send a control signal to the switching system to connect one or more of the plurality of energy storage units with the set of the plurality of inverters.

2. The energy storage control system of claim 1, wherein the control signal is a first control signal, the set of inverters is a first set of inverters, and the one or more of the plurality of inverters is a first one or more of the plurality of inverters;
wherein the controller is configured to:
establish a schedule of switching positions according to the determined number of the plurality of inverters, the schedule including a plurality of time periods for power delivery by different sets of the plurality of inverters, including the first set of inverters, for different time periods of the plurality of time periods; and
send the first control signal to the switching system to connect the first one or more of the plurality of energy storage units with the first set of the plurality of inverters for a first time period of the plurality of time periods and a second control signal to the switching system to connect second one or more of the plurality of energy storage units with a second set of the plurality of inverters for a second time period of the plurality of time periods.

3. The energy storage control system of claim 2, wherein the schedule includes a sequence of time periods each corresponding to a different set of the plurality of inverters, and wherein the controller is configured to:
send the second control signal to the switching system to connect the second one or more of the plurality of energy storage units with the second set of inverters for the second time period responsive to determining an end of the first time period and a beginning of the second time period.

4. The energy storage control system of claim 2, wherein the controller is configured to send the first control signal by causing, via the first control signal, the switching system to connect the first one or more of the plurality of energy storage units to a first set of two or more inverters of the plurality of inverters; and
wherein the controller is configured to send the second control signal by causing, via the second control signal, the switching system to connect the second one or more energy storage units of the plurality of energy storage units to a second set of two or more inverters of the plurality of inverters, the second set different from the first set.

5. The energy storage control system of claim 2, wherein the controller is further configured to:
detect a change in the required power of the load; and
adjust the schedule of switching positions based on the detected change in required power of the load.

6. The energy storage control system of claim 5, wherein the controller is further configured to:
responsive to detecting the change in required power of the load, identify a new required power for the load; and
determine a second number of the plurality of inverters to provide the new required power for the load based on the power rating of the plurality of inverters, wherein the controller is configured to adjust the schedule of switching positions by adjusting the schedule based on the second number of the plurality of inverters to provide the new required power for the load.

7. The energy storage control system of claim 1, wherein the controller is further configured to:
   detect a change in the required power of the load;
   responsive to detecting the change in required power of the load, identify a new required power for the load; and
   determine a second number of the plurality of inverters to provide the new required power for the load based on the power rating of the plurality of inverters,
      wherein the controller is configured to adjust the switching position of the switching system based on the second number of the plurality of inverters to provide the new required power for the load.

8. The energy storage control system of claim 1, wherein the controller is configured to:
   divide the required power for the load by the power rating of the plurality of inverters to determine a first value; and
   multiply the first value by a total number of the plurality of inverters to determine the number of the plurality of inverters.

9. The energy storage control system of claim 1, wherein the controller is further configured to:
   transmit a control signal to activate an inverter of the plurality of inverters responsive to determining a switching position of the switching system connects an energy storage unit to the inverter.

10. The energy storage control system of claim 1, wherein the power rating of the plurality of inverters comprises a power capacity at which one or more of the plurality of inverters reaches a maximum efficiency.

11. The energy storage control system of claim 1, wherein the power rating of the plurality of inverters comprises a maximum power capacity of the plurality of inverters.

12. The energy storage control system of claim 1, wherein the first one or more of the plurality of energy storage units includes the same or different energy storage units from the second one or more of the plurality of energy storage units.

13. A method of optimized loading of battery inverters, the method comprising
   determining, by a processor, a required power for a load;
   comparing, by the processor, the required power for the load with a power rating of a plurality of inverters coupled to the load and determining, by the processor, a number of the plurality of inverters to provide the required power;
   determining, by the processor, a switching position for a switching system coupled between the plurality of inverters and a plurality of energy storage units based on the determined number of the plurality of inverters, the switching position corresponding to power delivery by a set of the plurality of inverters, the set having the determined number of inverters; and
   sending, by the processor, a control signal to the switching system to connect one or more of the plurality of energy storage units with the set of the plurality of inverters.

14. The method of claim 13, wherein the control signal is a first control signal, the set of inverters is a first set of inverters, and the one or more of the plurality of inverters is a first one or more of the plurality of inverters, the method comprising:
   establishing, by the processor, a schedule of switching positions according to the determined number of the plurality of inverters, the schedule including a plurality of time periods for power delivery by different sets of the plurality of inverters, including the first set of inverters, for different time periods of the plurality of time periods; and
   sending, by the processor, the first control signal to the switching system to connect first one or more of the plurality of energy storage units with the first set of the plurality of inverters for a first time period of the plurality of time periods and a second control signal to the switching system to connect second one or more of the plurality of energy storage units with a second set of the plurality of inverters for a second time period of the plurality of time periods.

15. The method of claim 14, wherein the schedule includes a sequence of time periods each corresponding to a different set of the plurality of inverters, and the method comprises:
   sending, by the processor, the second control signal to the switching system to connect the second one or more of the plurality of energy storage units with the second set of inverters for the second time period responsive to determining an end of the first time period and a beginning of the second time period.

16. The method of claim 14, wherein sending the first control signal comprises causing, by the processor via the first control signal, the switching system to connect the first one or more of the plurality of energy storage units to a first set of two or more inverters of the plurality of inverters; and
   wherein sending the second control signal comprises causing, by the processor via the second control signal, the switching system to connect the second one or more energy storage units of the plurality of energy storage units to a second set of two or more inverters of the plurality of inverters, the second set different from the first set.

17. The method of claim 14, comprising:
   detecting, by the processor, a change in the required power of the load; and
   adjusting, by the processor, the schedule of switching positions based on the detected change in required power of the load.

18. The method of claim 17, comprising:
   responsive to detecting the change in required power of the load, identifying, by the processor, a new required power for the load; and
   determining, by the processor, a second number of the plurality of inverters to provide the new required power for the load based on the power rating of the plurality of inverters,
      wherein adjusting the schedule of switching positions comprises adjusting, by the processor, the schedule based on the second number of the plurality of inverters to provide the new required power for the load.

19. A non-transitory computer-readable medium comprising computer-executable instructions embodied thereon that, when executed by a processor, cause the processor to perform a method comprising:
   determining, by a processor, a required power for a load;
   comparing, by the processor, the required power for the load with a power rating of a plurality of inverters coupled to the load and determining, by the processor, a number of the plurality of inverters to provide the required power;

determining, by the processor, a switching position for a switching system coupled between the plurality of inverters and a plurality of energy storage units based on the determined number of the plurality of inverters, the switching position corresponding to power delivery by a set of the plurality of inverters, the set having the determined number of inverters; and sending, by the processor, a control signal to the switching system to connect one or more of the plurality of energy storage units with the set of the plurality of inverters.

20. The non-transitory computer-readable medium of claim 19, wherein the control signal is a first control signal, the set of inverters is a first set of inverters, and the one or more of the plurality of inverters is a first one or more of the plurality of inverters, the method comprising:

establishing a schedule of switching positions according to the determined number of the plurality of inverters, the schedule including a plurality of time periods for power delivery by different sets of the plurality of inverters, including the first set of inverters, for different time periods of the plurality of time periods; and sending the first control signal to the switching system to connect first one or more of the plurality of energy storage units with the first set of the plurality of inverters for a first time period of the plurality of time periods and a second control signal to the switching system to connect second one or more of the plurality of energy storage units with a second set of the plurality of inverters for a second time period of the plurality of time periods.

\* \* \* \* \*